United States Patent [19]

Welschof et al.

[11] Patent Number: 5,376,049
[45] Date of Patent: Dec. 27, 1994

[54] TRIPOD JOINT

[75] Inventors: Hans-Heinrich Welschof, Rodenbach; Peter Schwärzler, Glattbach; Michael Ricks, Bad Vilbel; Norbert Hofmann, Rodgau; Friedhelm John, Hanau-Steinheim; Hans Wormsbächer, Dreieich; Dieter Burghardt, Wiesbaden-Biebrich, all of Germany

[73] Assignee: Löhr & Bromkamp GmbH, Offenbach am Main, Germany

[21] Appl. No.: 946,400

[22] Filed: Sep. 17, 1992

[30] Foreign Application Priority Data

Sep. 18, 1991 [DE] Germany ............... 4130963

[51] Int. Cl.⁵ .............................. F16D 3/205
[52] U.S. Cl. ...................... 464/111; 464/123; 464/905
[58] Field of Search ............ 464/111, 122–124, 464/132, 905

[56] References Cited

U.S. PATENT DOCUMENTS

| | | | |
|---|---|---|---|
| 4,192,154 | 3/1980 | Nakamura et al. | 464/111 |
| 4,224,806 | 9/1980 | Kobayashi | 464/111 |
| 4,571,214 | 2/1986 | Orain | 464/111 |
| 4,589,856 | 5/1986 | Mazziotti et al. | 464/111 |
| 4,786,270 | 11/1988 | Iwasaki | 464/132 X |
| 4,954,119 | 9/1990 | Sasaki et al. | 464/111 |
| 5,137,496 | 8/1992 | Sasaki et al. | 464/111 |
| 5,167,583 | 12/1992 | Bensinger et al. | 464/111 |
| 5,171,185 | 12/1992 | Schneider | 464/405 X |
| 5,203,741 | 4/1993 | Turner et al. | 464/111 |

FOREIGN PATENT DOCUMENTS

| | | |
|---|---|---|
| 0426186 | 5/1991 | European Pat. Off. . |
| 441382 | 8/1991 | European Pat. Off. ............ 464/111 |
| 2600501 | 7/1977 | Germany . |
| 3741134 | 6/1988 | Germany . |
| 2135719 | 11/1990 | Japan . |

*Primary Examiner*—Daniel P. Stodola
*Assistant Examiner*—Eileen A. Dunn
*Attorney, Agent, or Firm*—Harness, Dickey & Pierce

[57] ABSTRACT

A tripod joint has an outer joint component having three circumferentially distributed recesses with parallel axes forming circumferentially opposing tracks. An inner joint component has a spider-shape cross-section with three circumferentially distributed arms which engage recesses of the outer joint component. The arms support roller assemblies. Each roller assembly includes a roller-carrier and a roller that runs directly on the tracks. The roller is arranged to slide axially along the arm axis and swivel with angular movement relative to the arm axis. A support is provided between the roller assembly and the outer joint component. The support absorbs tilting moments exerted on the roller assembly about an axis parallel to the joint axis and tilting moments exerted on the roller assembly about an axis perpendicular to, and spaced from, the joint axis. The support is provided by the roller engaging a pilot groove of the outer joint component whose depth is dimensioned such that the axial guided distance which is ($2 \times F_1$) in the pilot groove affecting the roller, is at least equal to one half of the roller diameter which is $2 \times R_1$. This means there is a relation of $F_1 \geq 0.5\, R_1$.

21 Claims, 18 Drawing Sheets

$R_2 \geq R_1$
$R_3 \leq 0{,}05\, R_1$
$0 < x \leq 0{,}5\, S_1$ $R_2 \geq R_1$
$R_3 \leq 0{,}05\, R_1$
$0 < x \leq 0{,}5\, S_1$ $D \approx R$

TRIPOD JOINT

BACKGROUND OF THE INVENTION

The invention relates to a tripod joint with an outer joint component having three circumferentially distributed recesses with parallel axes, forming circumferentially opposing tracks. An inner joint component having a spider-shape in cross-section with three circumferentially distributed arms engages the recesses of the outer joint component. Roller assemblies are supported on the arms. Each roller assembly includes a roller-carrying means and a roller running directly on the tracks. The rollers are arranged to slide axially to the arm axis and free to angularly pivot relative to the arm axis. Also support means are provided between the roller assembly and the outer joint component. The support means absorbs tilting moments exerted on the roller assembly about axes parallel to the joint axis and perpendicular to, and spaced from, the joint axis.

DE 28 31 044, DE 39 36 601 and DE 37 16 962 illustrate various types of tripod joints. Of the first two mentioned, each has the roller supported via a needle bearing on a roller carrier and free to rotate with the roller carrier arranged to slide axially on the arm and to swivel relative to the arm axis. For the first type, the movement is accomplished by an inner race which, with its spherical exterior, engages an at least partially spherical interior surface of the roller carrier. The inner race interior surface is cylindrical and is supported on a cylindrical arm.

In the second case, the roller carrier has an internally cylindrical opening in which an arm with a partially spherical head is engaged for radially sliding and swiveling movement.

The third version has, instead of a roller carrier, an interior roller with a spherical outer surface, which is directly supported and free to rotate on a cylindrical arm via a needle bearing. This interior roller engages an internally cylindrical cavity of the roller and is arranged to slide axially and swivel relative to the arm.

The generic term "elements of the roller assembly" refers to a roller carrier or an interior roller and a roller, where the two roller carriers of the first two joint types can be considered nonrotating elements of the roller assembly. In the following, "roller-carrying means" shall apply to all components of the "roller assembly" with the exception of the "roller".

In an articulated rotating joint, with reference to the interior joint component, radially oscillating movements of the rollers are generated relative to the joint axis as well as swiveling movements of the rollers on their arms and, simultaneously, with reference to the external joint component, longitudinally oscillating roller movements of the rollers are generated along the tracks. The first-mentioned radial and swivel movements are subject to friction while the second-mentioned roller movements predominantly occur as a rolling motion. Due to the frictional forces, with increasing articulation angles, all known tripod joints experience an increasing joint excitation force, e.g., the alternating forces originating in the joint are transmitted to the drive train. If in the course of the motion sequence of a rotating articulated joint, one of the arms, relative to the particular roller and with reference to the outer joint component, relocates toward the inside, and the roller requires radially inward support against the outer joint component, frictional forces are particularly high and detrimental. This is particularly true for support forces generated by tilting moments exerted on the roller assemblies about any axis tangential to the circumference.

SUMMARY OF THE INVENTION

This invention provides the above joint configurations, particularly including the three specifically cited designs, with a manner modifying the roller guidance provided by the tracks. Particularly, the invention opposes the aforementioned tilting moments, to provide low friction in order to reduce the joint excitation forces.

An object of the invention provides that all affected surfaces between the elements of the roller assembly and the external joint component are either of a particularly large design or the affected surfaces of the particular roller element are radially enlarged beyond the rolling diameter of the roller. The radial support surfaces may on one side be formed between the rotating roller or the nonrotating elements of the roller assembly, and on the other side by the outer joint component. These solutions are based on the idea that a reduction of frictional forces occurs when the normal forces are reduced at the point of contact with the support means. In this respect, the surfaces effecting the guidance of the roller, e.g., the surfaces effecting its support against the tilting moments, run essentially parallel with the tangential direction of the force transfer between the roller and the outer joint component during introduction of torque into the joint. This is equivalent to a statement indicating that the surfaces effecting the guidance of the roller, e.g., surfaces effecting the radial support of the roller assembly against tilting moments, run essentially perpendicular to the radial support forces. The forces to be absorbed by the guidance means or guiding surfaces, are generated by a combination of purely radial forces, relative to the outer joint component, that are caused by the oscillating arm movement and by tilting moments applied to the rollers caused by the wobbling arm movement relative to the rollers during rotation of the articulated joint. Thus, surfaces subjected to transfer torques are protected from forces introduced through roller guidance action, e.g., forces based on tilting moments. Preferably, to reduce cost, these surfaces are purely cylindrical relative to the roller.

In a first embodiment, the supporting means is formed by engagement of the roller in a pilot groove of the outer joint component. The effective guided distance between the pilot groove and the roller, measured in the axial direction of the outer joint component, is at least equivalent to one half of the roller diameter. Due to the large effective support edge, the normal forces are low which, in turn, helps to reduce friction. This solution is particularly preferable in applications for a roller with a purely cylindrical rolling surface. As in the configurations explained in the following, at least one of the adjacent surfaces of the roller or the track may be radiused as seen in a cross-section view of the joint while, in cross-sectional, the lead-ins may be in the form of arcs, parabolas, hyperbolas or ellipses.

According to a second embodiment, the support means is formed by the engagement of at least one pilot flange in at least one pilot groove. One of these elements is formed on the outer joint component, axial to the outer joint component, and the other one of the elements is formed on the roller assembly. The pilot flange is guided on both sides directly by the pilot groove.

Optionally, the support means support may be formed by the engagement of a longitudinal pilot flange of the outer joint component in a circular groove of the roller. Preferably, the pilot flange is provided with radial clearance from the roller axis, e.g., with space from the base of the circular groove, even when the track is loaded during introduction of torque. Preferred shapes for the adjacent flanks of the track or the roller, in cross-sectional view of the joint, are equivalent to those discussed previously.

Alternatively, the support means may be formed by a pilot shoulder of the roller or roller carrier, projecting radially beyond the running surface of the roller to engage a pilot groove of the outer joint component. The shoulder may be on the face of the roller or, by reversal of the aforementioned solution, centrally on the roller. With dual rollers, the roller carrier may have a shoulder centrally arranged between the rollers.

With respect to the pilot grooves, the shoulders are configured to have radial clearance from the loaded track, e.g., a distance from the respective base of the pilot groove during introduction of torque. Preferable shapes for the adjacent flanks of the track or the roller, in cross-section, are equivalent to those previously discussed.

When configuring the pilot shoulder on the actual roller, in radial plan view, the pilot shoulder is concentric and of a round shape. When configuring the pilot shoulder on a nonrotating component of the roller assembly, e.g., on a roller carrier, in axial plan view of the roller assembly in the area of groove engagement, the shoulder may also be essentially bound by straight lines in order to obtain more leverage opposite the tilting moments, thus, reducing the normal forces.

Pilot flanges or pilot shoulder on parts of the roller assembly may be made from sheet metal elements that are clamped, welded or secured, e.g., to the roller carrier, by means of retainer rings. The guiding tracks or pilot grooves may be formed directly inside the outer joint component or, using additional sheet metal elements, on the outer joint component.

In another option, a pilot groove is in the outer joint component, and corresponding pilot flanges or pilot shoulders are on parts of the roller assembly, only on the one side of the track of the outer joint component that is loaded during introduction of torque. This design avoids the risk of jamming or locking as a result of the abovementioned tilting forces about the transverse axis.

Another option is designed to relieve the primary pilot grooves and pilot flanges associated with the roller assembly of loads generated by tilting moments about a Q axis. The Q axis is spaced from and perpendicular to the joint axis. Load relief is provided by secondary support edges or support guides in the outer joint component, especially radially outside the roller assembly, which preferably interface with the external faces of the roller assembly.

The various support means may be applied either individually to the same element of the roller assembly or, alternatively, on the one side to the roller and, on the other side, to the roller carrier. The purpose of the aforementioned means is to prevent the frictional forces between roller and track from interfering with the rolling motion of a roller on its tracks within the outer joint component, which would increase the joint's excitation forces.

Another variation is characterized by rollers with cylindrical running surfaces retained in guiding tracks with the one side of the recess, which is loaded during torque initiation, configured with a convex running surface. Another variation is rollers with spherical running surfaces retained in guiding tracks with at least the one track located on the side of the recess loaded during torque initiation, configured with a flat or convex running surface. Another variation is the rollers have spherical running surfaces where the radius of the running surface curvature, in a cross-sectional view of the joint, is at least equal to the roller diameter. This design will reduce or inhibit the generation of frictional forces in the track area and limit it to the pilot shoulders area.

Additionally, the roller may have, adjacent to its actual running surface, at least one external spur gear. The track, loaded during torque initiation in the normal rotational direction, includes at least one longitudinal gear rack configuration in the outer joint component to engage with the spur gear of the roller. This guarantees positive rolling action of the roller in its track which prevents frictional forces from also appearing in these tracks. The results of such a rack-and-pinion design are present in the desired manner with any type of guidance for a roller on its track, which guarantees an essentially, intrinsically parallel position of the roller, e.g., also for configurations deviating in principle from the aforementioned details of the support means.

Also rollers may have at least one spur gear beside their running surface. In this case, axial gear racks engaging the spur gears are formed only on one side of the recesses in the outer joint component. Due to the elastic compliance of this feature, any risk of jamming is eliminated by the support means.

From the following detailed description taken in conjunction with the accompanying drawings and subjoined claims, other objects and advantages of the present invention will become apparent to those skilled in the art.

BRIEF DESCRIPTION OF THE DRAWINGS

The following is a description of preferable configurations of this invention, with references to the respective drawings.

FIG. 4b is a sectional view of the roller of 4a.

FIG. 6b is a top plan view of the non-rotating carrier of FIG. 6a.

FIG. 7b is a top plan view of the non-rotating carrier of FIG. 7a.

FIG. 8b is a top plan view of the non-rotating carrier of FIG. 8a.

FIG. 9b is a top plan view of the non-rotating carrier of FIG. 9a.

DETAILED DESCRIPTION OF THE PREFERRED EMBODIMENTS

Figure 1:
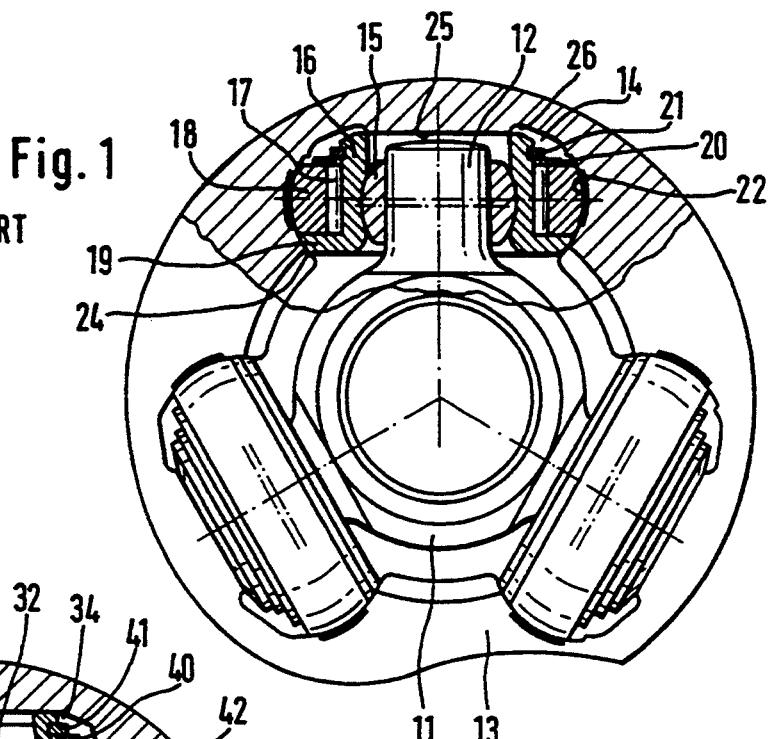
FIG. 1 is a plan view partially in section of a tripod joint in accordance with the present invention.

FIG. 1 shows an essentially annular inner joint component 11 having circumferentially distributed radial cylindrical arms 12. An outer joint component 13 with circumferentially distributed recesses 14 houses the arm 12. The arms include roller assemblies, one of which is shown in cross-sectional view.

The roller assemblies each include an inner roller 15 with a cylindrical interior surface and a spherical exterior surface. Relative to the arm 12, the inner roller 15 oscillates axially with reference to the arm axis. The inner roller 15 retains a roller carrier 16 with an internally spherical cavity swivelably mounted on the spherical exterior surface of the inner roller 15. The roller carrier 16 retains a roller 18 via a needle bearing 17. Specifically, the needle bearing 17 and the roller are retained by a radially internal shoulder 19 of the roller carrier 16, and a radially external disc 20 and a retainer ring 21. Each of the externally spherical rollers 18 moves under torque on one of the tracks 22 in the recess 14. Radially inside the roller assembly, the track has a shoulder 24 on the one side. The roller carrier 19 is supported radially outside the roller assembly by a support surface 25. This area is limited to an area near the arm axis, by radial extensions 26 on either side of the recess 14.

Figure 2:
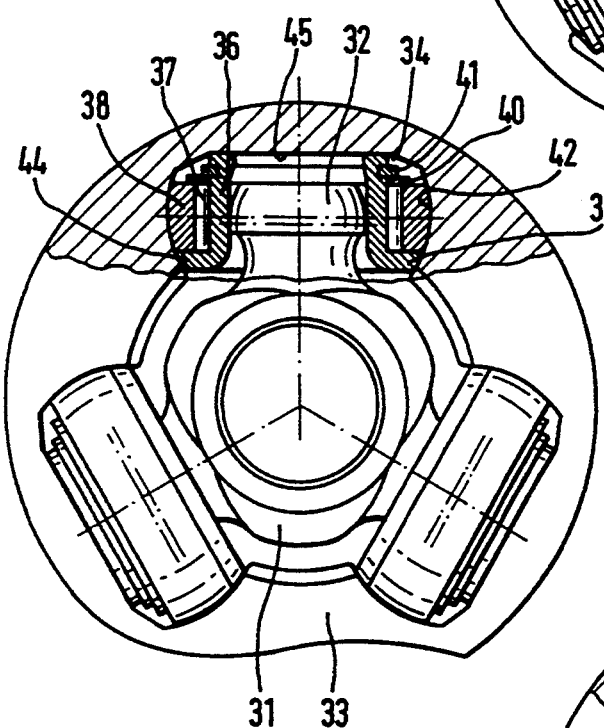
FIG. 2 is a plan view partially in section of a tripod joint in accordance with another embodiment of the present invention.

FIG. 2 shows an essentially annular inner joint component 31 having, radially adjacent to it, circumferentially distributed, externally spherical arms 32 which engage an outer joint component 33 with circumferentially distributed recesses 34. Roller assemblies, one of which is shown in cross-section, are provided between the arms and recesses.

Each roller assembly includes a roller carrier 36 having a cylindrical interior opening by which it is retained and free to slide axially on the arm 32 and swivel relative to the arm axis. The roller carrier 36 retains a roller 38 via a needle bearing 37. Needle bearing 37 and roller 38 are retained on the roller carrier, on the one side, via a radially internal shoulder 39 and, on the other side, by an external disc 40 and retainer ring 41. Both halves of the interior recess 34 have individual, internally cylindrical tracks 42 closely followed by the radially interior shoulder 44 on opposing sides. An external support surface 45 which is allowed to contact the roller carrier 36 during initiation of torque, is between the tracks 42.

Figure 3:
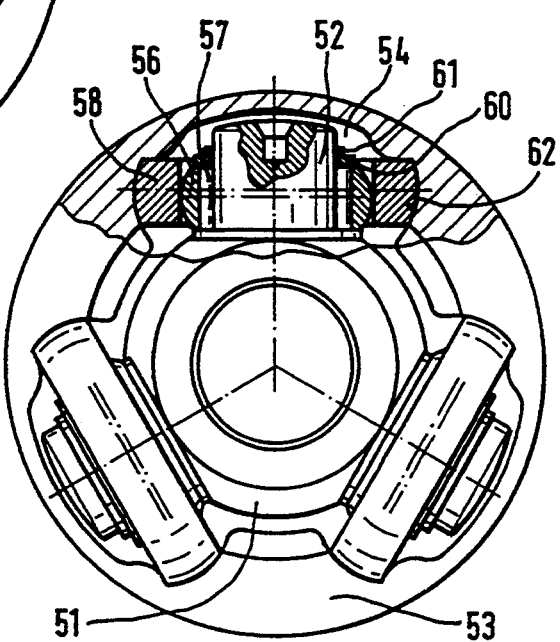
FIG. 3 is a plan view partially in section of a tripod joint in accordance with another embodiment of the present invention.

FIG. 3 shows an essentially annular inner joint component 51 with circumferentially distributed radial arms 52 and an outer joint component 53 with circumferentially distributed tracks 54 which are engaged by the arms. The torque transfer between the arms and recesses is accomplished by roller assemblies, one of which is shown in cross-section. Each of the cylindrical arms 52, via a needle bearing 57, supports a rotating interior roller 56 with a spherical exterior surface. The interior roller 56 supports a roller 58 having a cylindrical interior surface free to slide axially and swivel relative to the arm axis. The rollers 58 moves in tracks 62 in both halves of the recess 54. The needle bearing 57 and the interior roller 56 are axially fixed to the arm via a disc 60 and a retainer ring 61.

The embodiments according to FIGS. 4 and 5, do not necessarily show to which variety of the joint category they refer. These embodiments are applicable to any joint configuration based on FIGS. 1 through 3. The respective guidance means for the roller opposite the outer joint component are formed on the roller.

Figure 4A:
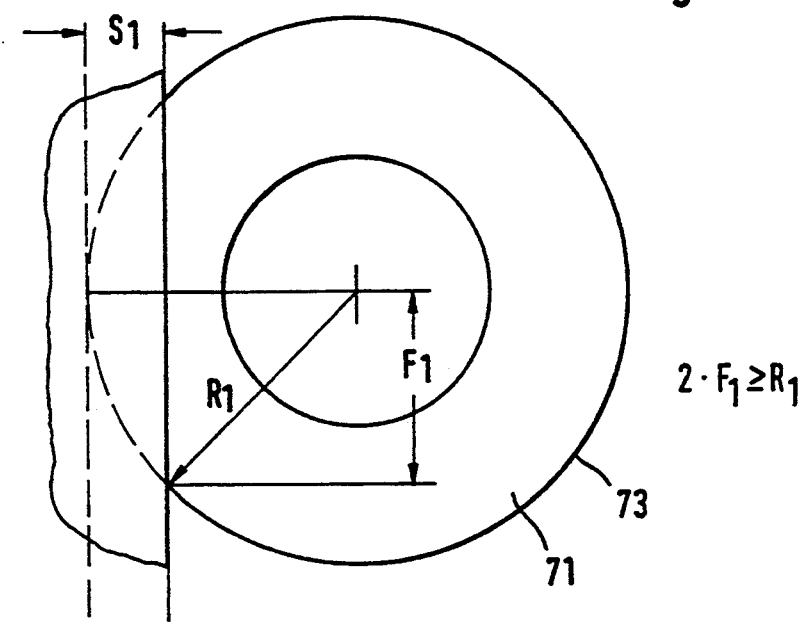
FIG. 4a is a plan view of a roller in accordance with the present invention.
Figure 4B:
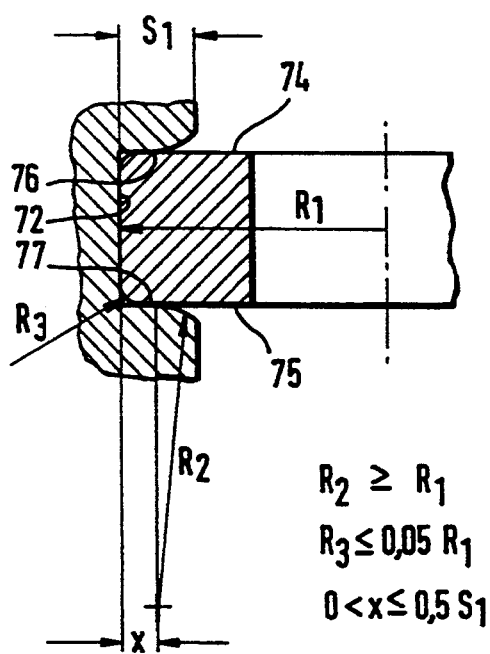
Figure 4C:
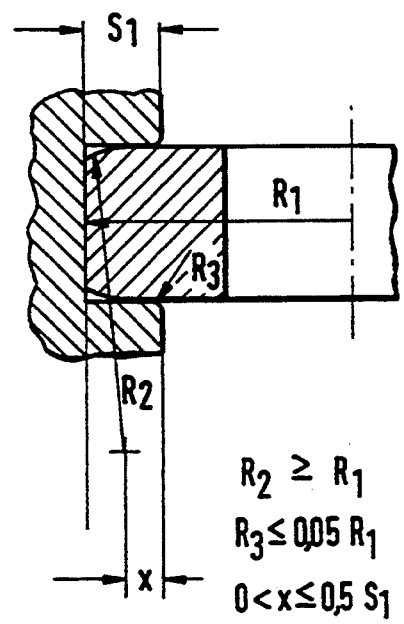
FIG. 4c is a view like 4b of another embodiment of the present invention.

FIG. 4a shows a roller 71 in plan view, engaged in a groove 72, with the FIGS. 4b and 4c representing different embodiments of the roller and the groove. The depth $S_1$ of the groove engagement is dimensioned so that the length $2F_1$ of the guiding area of the groove opposite the roller, is at least half the size of the roller diameter $2R_1$. This requires $S_1 \geq R_1 \times (1 - \cos 30°)$, e.g., the roller must engage the groove at an angle of at least 30°. The running surface 73 of the roller 71 contacts the groove 72 at the bottom. The faces 74, 75 of the roller 71 run with minimum clearance between the flanks 76, 77 of the groove.

As can be seen from the FIGS. 4b and 4c, either the flanks 76, 77 of the groove 72 should be radiused and the faces 74, 75 of the roller 71 essentially flat (FIG. 4b), or the flanks 76, 77 of the groove 72 should essentially be flat while the faces 74, 75 of the roller 71 should be radiused facing the running surface 73 (FIG. 4c). The rounding of edges of the respective groove flanks or roller edges, should amount to at least one half of the depth of engagement (0.5 $S_1$), with the radius $R_2 \geq R_1$. The depth X of the remaining flat guiding areas therefore is $X \leq 0.5\ S_1$. Each of the radii $R_3$ of the essentially flat faces (FIG. 4b) or track flanks (FIG. 4c) should be dimensioned at $R_3 \leq 0.05\ R_1$. The respective equations are listed in the drawing.

Figure 5A:
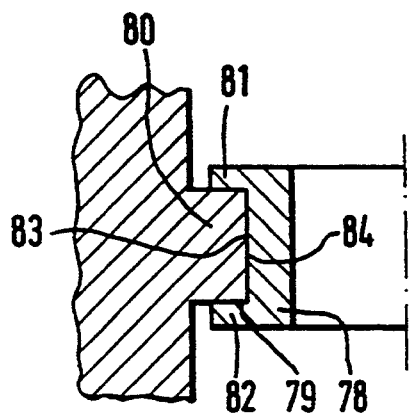
FIGS. 5 a through d illustrate various types of rollers engaging a pilot groove.

FIG. 5a shows a roller 78 having a circumferential groove 79 which forms a cylindrical running surface 83 that runs on a track 84 located on a pilot flange 80 of the outer joint component. The running surface 83 is on either side configured with pilot collars 81, 82 which, relative to the roller axis, have radial clearance from the outer joint component, and whose interior flanks, relative to the roller axis, have axial clearance from the respective flanks of the pilot flange 80.

Figure 5B:
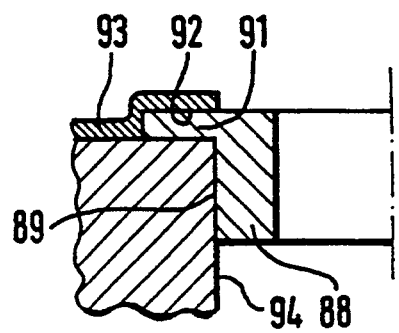

FIG. 5b shows a roller 88 having a cylindrical running surface 89 rolling on the track 94 of the outer joint component. A pilot collar 91 engages a circular groove 92 with axial and radial clearance relative to the roller axis. The circular groove 92 is formed by a sheet metal component 93 on the external joint component.

Figure 5C:
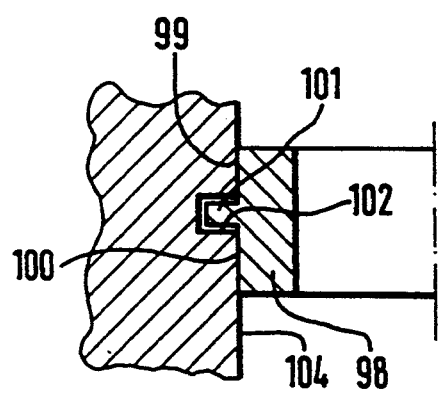

FIG. 5c shows a roller 98 having two cylindrical running surfaces 99, 100, and an intermediary pilot collar 101. The collar 101 engages a linear groove 102 of the outer joint component with radial and axial clearance relative to the roller axis. The roller runs on the track 104 which is divided by the linear groove 102.

Figure 5D:
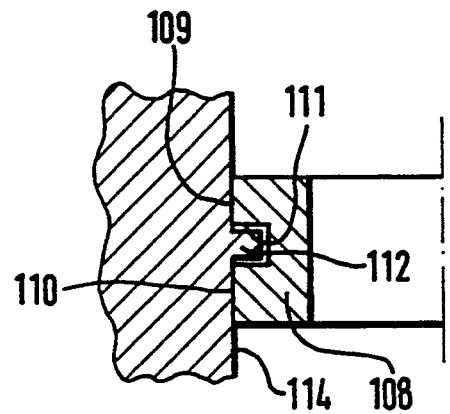

FIG. 5d represents the reversal of FIG. 5c. Here, a roller 108 has two cylindrical running surfaces 109, 110, with an intermediary circular groove 111 engaged by a pilot flange 112 of the outer joint component with axial and radial clearance relative to the roller axis. The roller runs on the track 114 which is divided by the pilot flange.

The embodiments according to the following FIGS. 6 through 18, each show partial section views of a joint according to the design version of FIG. 2 without being necessarily limited to it. Where the guidance means is indicated for the roller carrier, applications like those used for joints of the type in FIGS. 1 and 2 would be appropriate. Where the guidance means is configured on the actual roller, application like that of FIG. 3 is also possible.

Figure 6A:
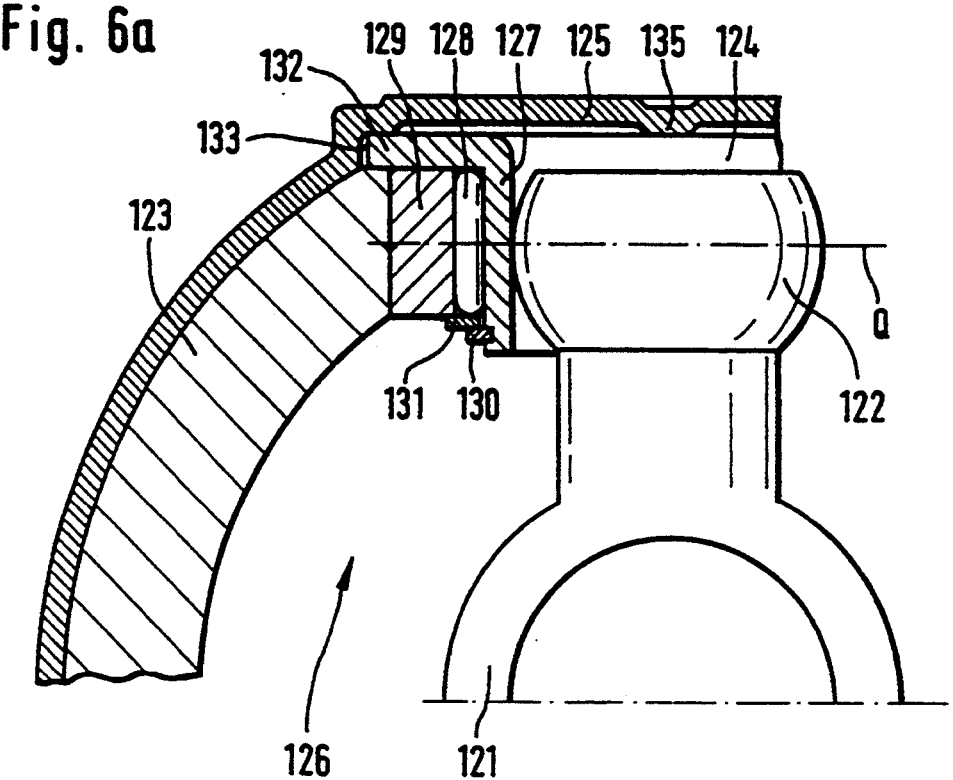
FIG. 6a is a sectional view of a joint according to the present invention.

FIG. 6a shows an essentially annular internal joint component 121 in a partially cross-sectional view with one of three circumferentially distributed radial arms 122 with a spherical head. Also shown is an annular outer joint component 123 with one of three circumferentially distributed recesses 124. The recess is essentially open on the outside but covered by a slide-on sheet metal sleeve 125. A roller assembly 126 including a roller carrier 127 and a roller 129 retained on it is free to rotate via a needle bearing 128. Needle bearing 128 and roller 129 are secured to the internally cylindrical roller carrier 127 via a retainer ring 130 and a disc 131. The spherical head of the arm 122 is guided inside the roller carrier and is axially relocatable and free to swivel relative to the roller axis. The roller carrier 127 has a pilot shoulder 132 engaging a pilot groove 133 which is formed between the sleeve 125 and the outer joint component 123. Relative to the pilot groove 133, the affected area of the pilot shoulder 132 has radial and axial clearance with reference to the roller axis. Centrally above the arm, the sleeve 125 is provided with a stamped rail 135 which is designed to absorb tilting moments about the horizontal Q-axis of the roller carrier 132.

Figure 6B:
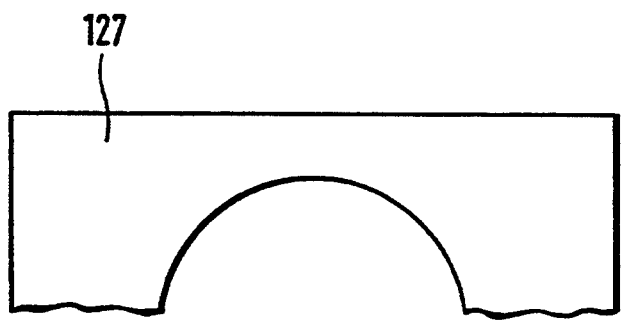
Figure 6C:
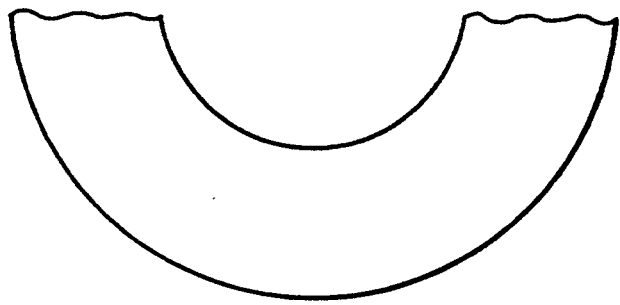
FIG. 6c is a view like 6b of an alternate embodiment of the present invention.

As can be seen below, from the top view of the roller carrier as a detail shown in FIGS. 6b and 6c, the basically nonrotating roller carrier 127 may, in the area of the pilot groove, be bounded by straight lines or sides (FIG. 6b) or, in top view, be of a circular shape (FIG. 6c).

Figure 7A:
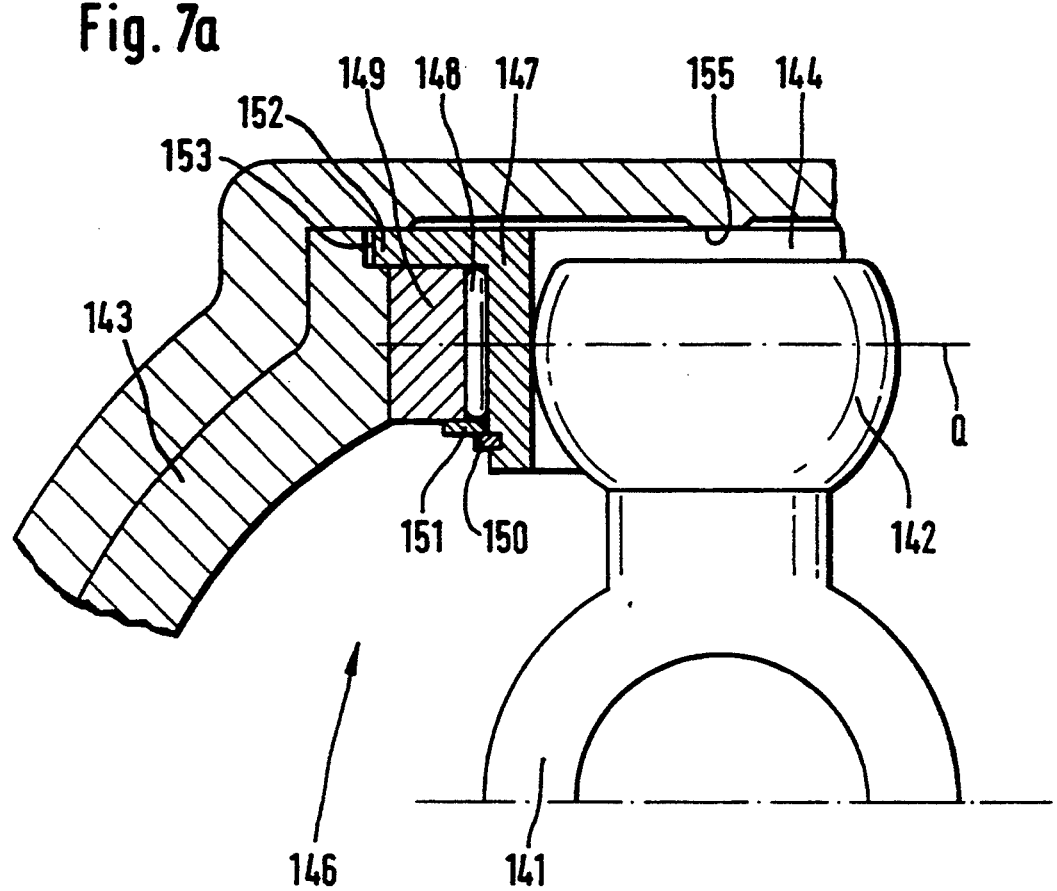
FIG. 7a is a sectional view of a joint according to the present invention.

FIG. 7a shows an essentially annular, inner joint component 141 in a partial section view with one of three attached circumferentially distributed radial arms 142 with a spherical head. An annular outer joint component 143 is shown with one of three circumferentially distributed cavities 144. A roller assembly 146 which includes a roller carrier 147 and a roller 149 secured to it via a needle bearing 148 is free to rotate about the arm. Needle bearing 148 and roller 149 are secured to the internally cylindrical roller carrier 147 via a retainer ring 150 and a disc 151. The spherical head of the arm 142, guided inside the roller carrier, is axially relocatable and free to swivel, relative to the roller axis.

The roller carrier has a pilot shoulder 152. The outer joint component 143 is provided with a pilot groove 153. Relative to the is pilot groove 153, the affected area of the pilot shoulder 152 has radial and axial clearance with reference to the roller axis. Centrally above the arm, the external joint component 143 is raised to form a rail 155 which is designed to absorb tilting moments about the horizontal Q-axis of the roller carrier 152.

Figure 7B:
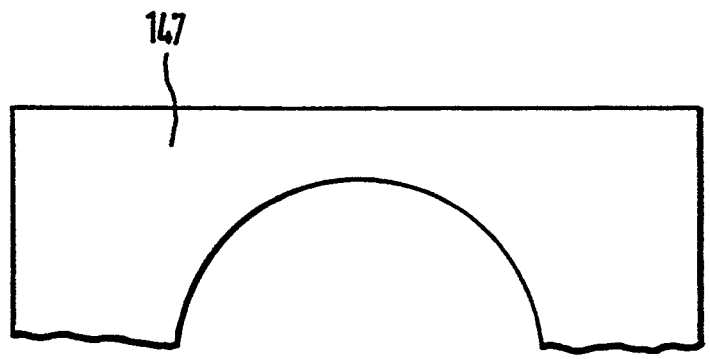
Figure 7C:
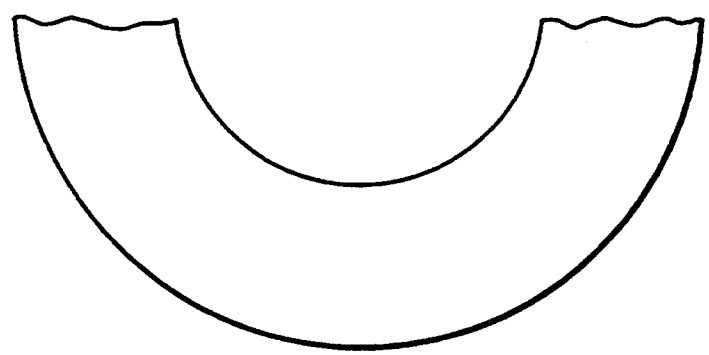
FIG. 7c is a view like 7b of an alternate embodiment of the present invention.

As can be seen in FIGS. 7b and 7c, the basically nonrotating roller carrier 147 may, in the area of the pilot groove, be bounded by straight lines or sides (FIG. 7b) or, in top view, by a circular shape (FIG. 7c).

Figure 8A:
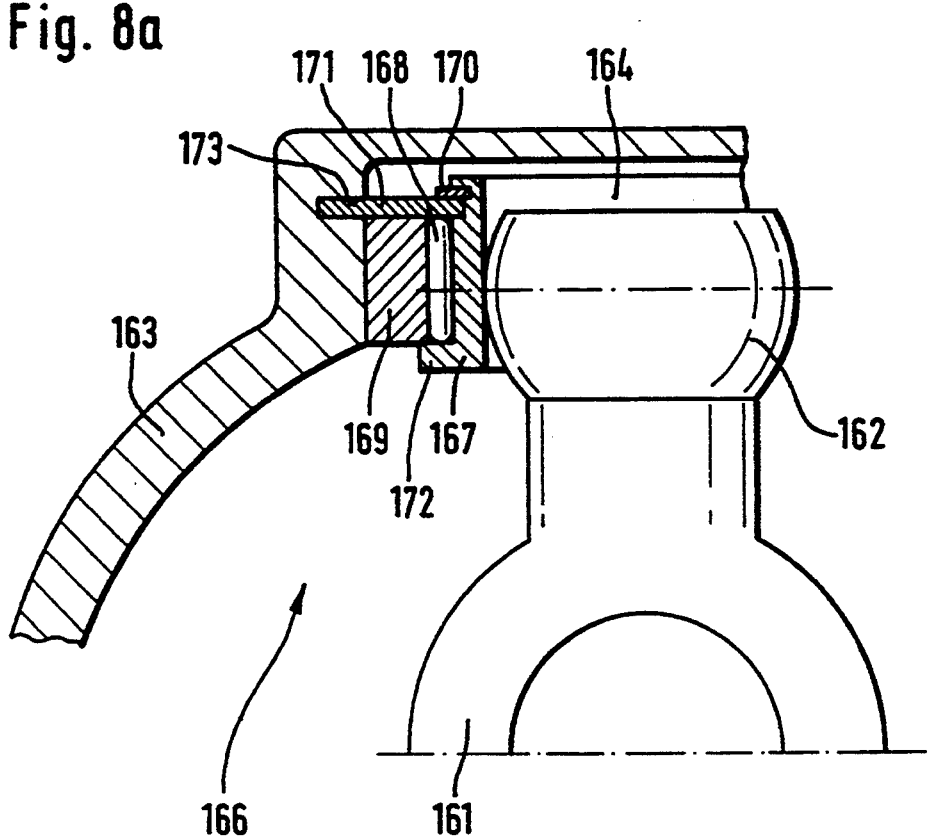
FIG. 8a is a sectional view of a joint according to the present invention.

FIG. 8a shows an essentially annular, inner joint component 161 in partial section view with one of three attached circumferentially distributed radial arms 162 with a spherical head. An essentially annular, outer joint component 163 is shown with one of three circumferentially distributed recesses 164. A roller assembly 166 which includes a roller carrier 167 and a roller 169 secured to it via a needle bearing 168 is free to rotate on the arm. Needle bearing 168 and roller 169 are secured to the internally cylindrical roller carrier 167 via a retainer ring 170 and a disc 171. The spherical head of the arm 162, guided inside the roller carrier, is axially relocatable and free to swivel relative to the roller axis. The disc 171 directly engages a pilot groove 173 of the external joint component and extends radially beyond the roller diameter relative to the roller axis. The disc 171 is located radially outside the roller relative to the joint axis. Also, the roller, needle bearing and roller carrier 167 are all retained by an internal shoulder 172 of the roller carrier. The disc 171 has radial and axial clearance relative to the pilot groove with reference to the roller axis.

Figure 8B:
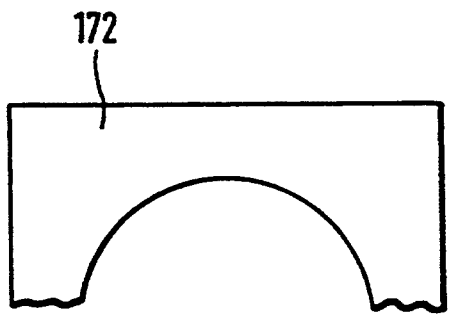
Figure 8C:
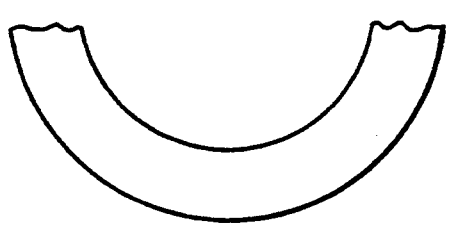
FIG. 8c is a view like 8b of an alternate embodiment of the present invention.

As can be seen in FIGS. 8b and 8c, the basically nonrotating disc 172 may, in the area of the pilot groove, be bounded by straight lines or sides (FIG. 8b) or, in top view, of a circular shape (FIG. 8c).

Figure 9A:
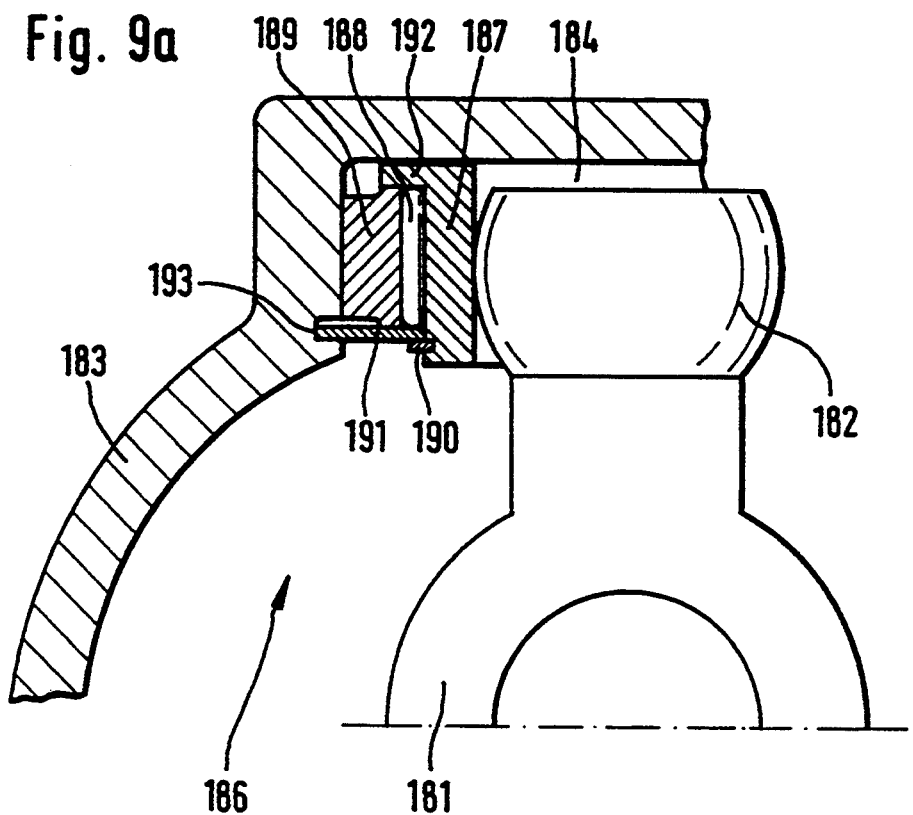
FIG. 9a is a sectional view of a joint according to the present invention.

FIG. 9a shows an essentially annular, inner joint component 181 in a partial section view with one of three attached circumferentially distributed radial arms 182 having a spherical head. An essentially annular outer joint component 183 is shown with one of three circumferentially distributed recesses 184. A roller assembly 186 which includes a roller carrier 187 and a roller 189 secured to it via a needle bearing 188 is free to rotate about the arm. Needle bearing 188 and roller 189 are secured to the internally cylindrical roller carrier 187 via a retainer ring 190 and a disc 191. The spherical head of the arm 182 guided inside the roller carrier is axially relocatable and free to swivel relative to the roller axis. The disc 191 directly engages a pilot groove 193 of the outer joint component and extends radially beyond the roller diameter relative to the roller axis. Also, the disc 191, located radially inside the roller relative to the joint axis, and roller carrier 187 are all retained by an external shoulder 192 of the roller carrier. The dimensioning of the roller carrier 187 relative to the axial distance between the disc 191 and shoulder 192 may be selected so that the disc is radially inwardly supported in the pilot groove 193 with reference to the joint axis. Also, the disc radially outwardly has a free space allowing the roller assembly to be supported by the shoulder 192 in the radially outward direction in reference to the joint axis relative to the joint axis. Nevertheless, relative to the outer joint component, the free space at the shoulder 192 may be large enough for the disc 191 to assume the radial support in both direction.

Figure 9B:
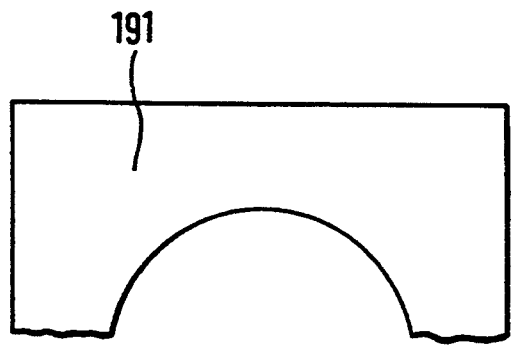
Figure 9C:
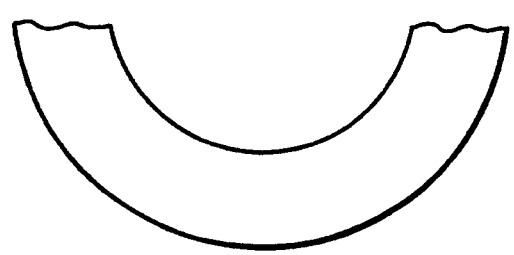
FIG. 9c is a view like 9b of an alternate embodiment of the present invention.

As can be seen in FIGS. 9b and 9c, the basically non-rotating disc 192 may, in the area of the pilot groove, be bounded by straight lines or sides (FIG. 9b) or, in top view, by a circular shape (FIG. 9c).

Figure 10A:
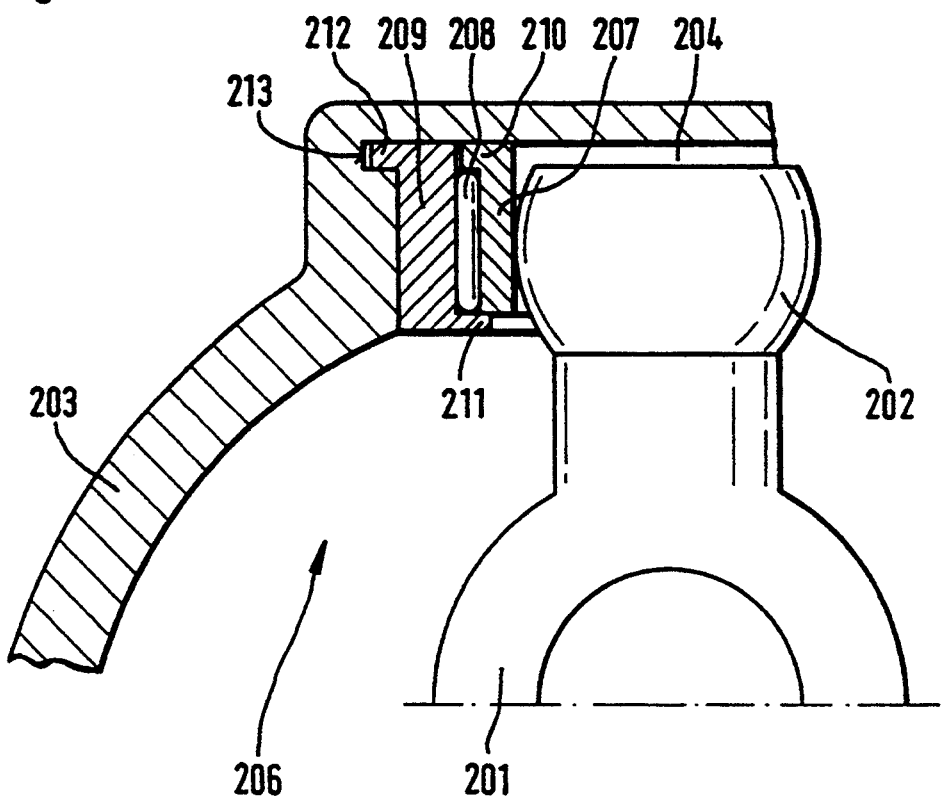
FIG. 10a is a sectional view of a joint according to the present invention.

FIG. 10a shows an annular internal joint component 201 with one of three circumferentially distributed arms 202 having a spherical head. The internal joint component 201 engages an outer joint component 203 at one of three circumferentially distributed recesses 204. A roller assembly 206 is provided between the spherical head and the recess. The roller assembly includes an internally cylindrical roller carrier 207 and a roller 209 secured to it via a needle bearing 208. The roller assembly is free to rotate about the arm. The roller carrier 207 has a radially external and, relative to the joint axis, radially outward-directed collar 210. The roller 209 is provided with an internal and radially inward-directed collar 211 relative to the joint axis. The collar provides retention for the assembled components. The roller 209 engages a pilot groove 213 via a radially external, outwardly directed annular shoulder 212. The shoulder has radial and minimal axial clearance relative to the roller axis. Opposed by forces that are transmitted radially outward to the roller carrier 207 by the arm, the roller assembly is directly supported at the bottom of the recess 204 via the collar 210 of the roller carrier 207, while the support of the roller assembly radially inward, against the pilot groove 213, is provided via the annular shoulder 212 of the roller 209.

Figure 10B:
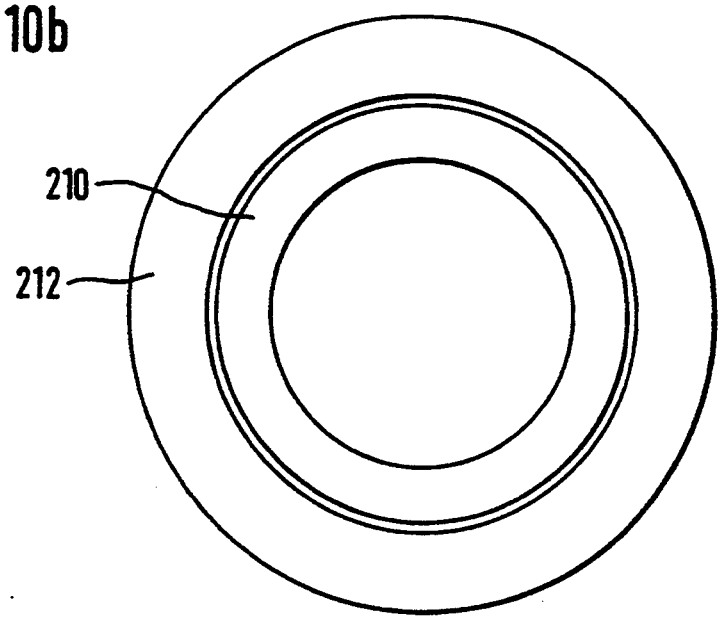
FIG. 10b is a top plan view of the carrier of 10a according to the present invention.

As can be seen from FIG. 10b the annular shoulder 212 directly attached to the roller 209 is, in top views of a circular shape.

Figure 11A:
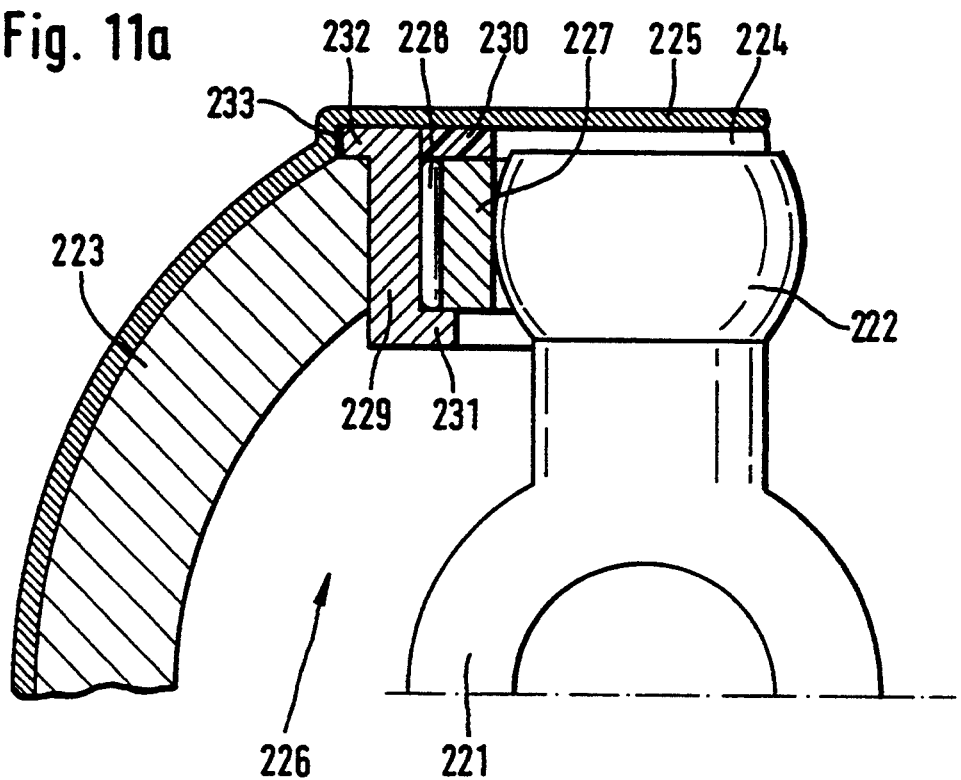
FIG. 11a is a sectional view of a joint according to the present invention.

FIG. 11a shows an annular, inner joint component 221 with one of three circumferentially distributed arms 222 having a spherical head. The inner joint component 221 engages an outer joint component 223 shown with one of three circumferentially distributed, externally open recesses 224. These recesses are externally covered by means of a slide-on sheet metal sleeve 225 installed on the outer joint component 223. A roller assembly 226 is provided between the spherical head and the recess. The roller assembly includes internally cylindrical roller carrier 227 and a roller 229 secured to it via a needle bearing 228. The roller assembly is free to rotate. The roller carrier 227 is of annular and cylindrical shape. The roller 239 has a radially interior, relative to the joint axis, but, relative to the roller axis, has a radially outward-directed collar 231 providing relative retention for the assembled components of the roller assembly. The roller 213 has a radially exterior, outwardly directed annular shoulder 232 which engages a pilot groove 233 which has minimal radial and axial clearance with reference to the roller axis. Opposed by forces transmitted radially outward to the roller carrier 227 by the arm, the roller assembly 227 is supported at the bottom of the recess 224 via an elastic spacer 230, while radially inward support for the roller assembly is provided by the pilot groove, via the annular shoulder 232 of the roller 229.

Figure 11B:
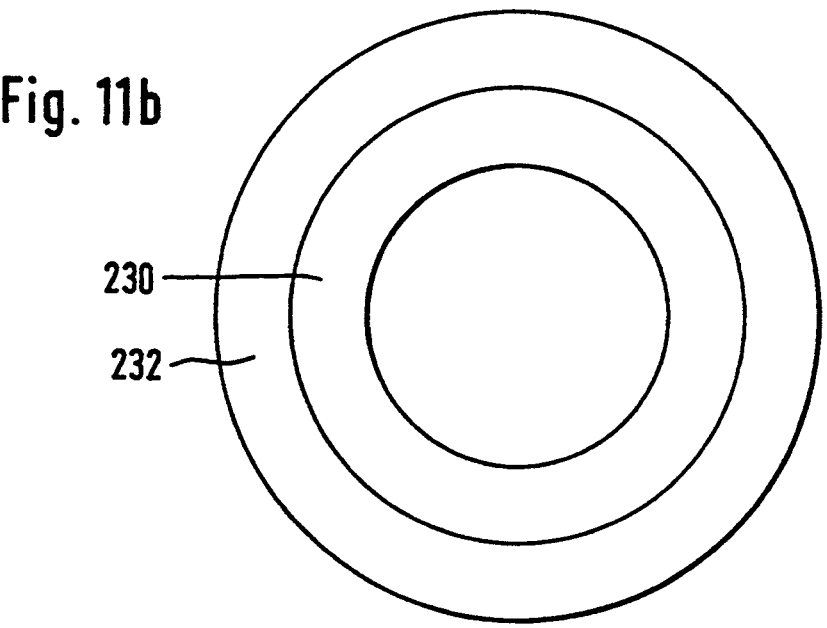
FIG. 11b is a top plan view of the carrier of 11a according to the present invention.

As can be seen in FIG. 11b, the spacers, roller and the annular shoulder 231, directly attached to the roller 229 are, in top view, of a circular shape.

Figure 12A:
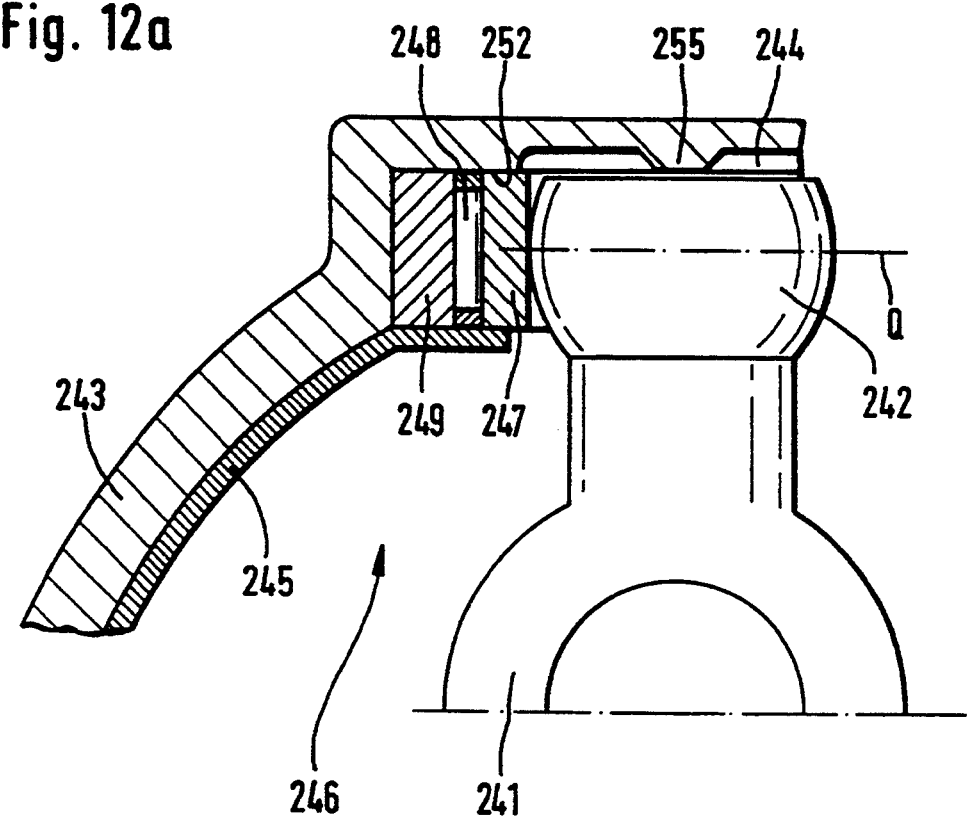
FIG. 12a is a sectional view of a joint according to the present invention.
Figure 12B:
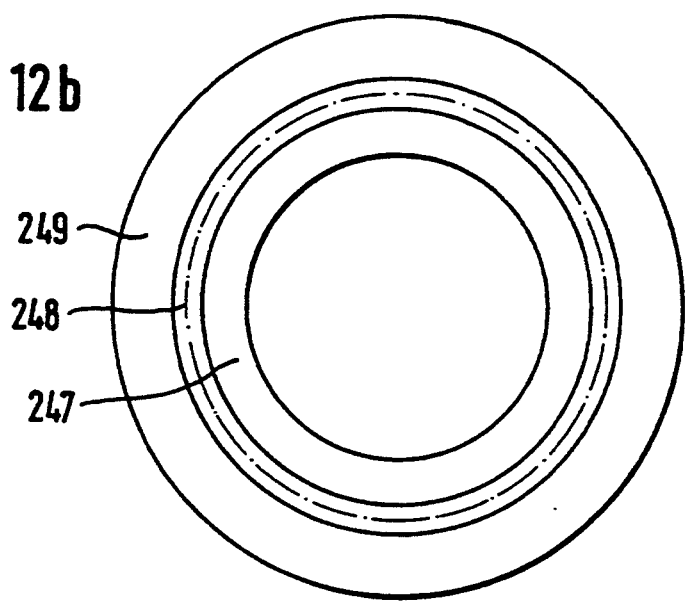
FIG. 12b is a top plan view of the carrier of 12a according to the present invention.

FIG. 12a shows an essentially annular, inner joint component 241 with one of three circumferentially distributed arms with a partially spherical head. The inner joint component is inserted into an outer joint component 243, shown with one of three circumferentially distributed recesses 244. A roller assembly 246 is provided between the spherical head and the recess. A sleeve 245, partially slotted axially in the vicinity of recess 244, is inserted in the outer joint component to provide radial retention for the roller assembly 246 relative to the joint axis. The roller assembly 246 includes a roller carrier 247 with an internally cylindrical cavity which provides guidance for the partially spherical head which is axially relocatable and free to swivel relative to the roller axis. The roller carrier 247 supports the essentially internally and externally cylindrical roller 249 via a needle bearing 248. This roller has, relative to the joint axis, minimal radial clearance from the external joint component 243 or the sheet metal sleeve 245. Also, the roller carrier 247 is supported radially outward, by the shoulders 249, radially inward by the rims of the sleeve 245, and against tilting forces about the transverse Q-axis by a central guiding rail 255. As shown in FIG. 12b, both the roller carrier and the roller are of a cylindrical shape.

Figure 13A:
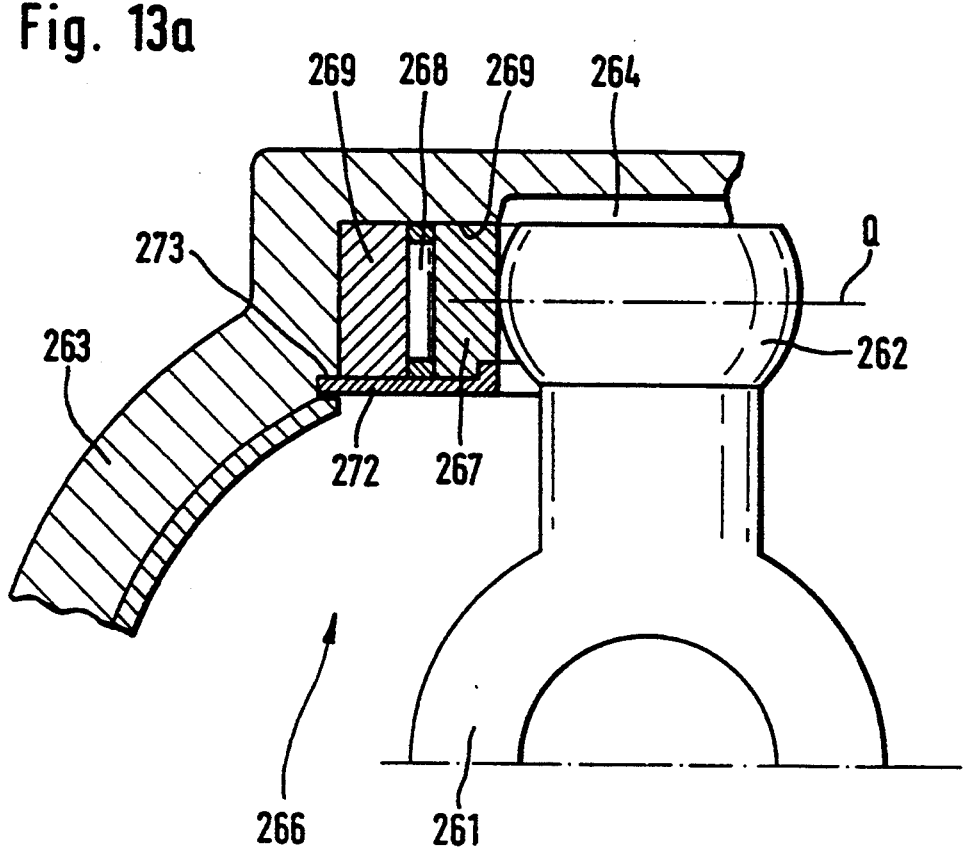
FIG. 13a is a sectional view of a joint according to the present invention.

FIG. 13a shows an essentially annular, inner joint component 261 with one of three circumferentially distributed arms having a partially spherical head. The inner joint component 261 is inserted into an outer joint component 263 shown with one of three circumferentially distributed recesses 264 corresponding to the arms. A roller assembly 266 is provided between the spherical head and the recess. The roller assembly includes a roller carrier 267 with an internal cylindrical cavity which provides guidance for the partially spherical head that is axially relocatable and free to swivel relative to the roller axis. The roller carrier 267 supports an essentially internally and externally cylindrical roller 269 via a needle bearing 268. The parts of the roller assembly are retained by a disc 272 which is located inside the roller assembly relative to the joint axis. The disc 272 engages a pilot groove 273 of the outer joint component. This disc may be attached to the roller carrier by clamping. The disc 272 has minimal radial clearance from the outer joint component, while the roller carrier 267 is externally supported by the shoulders 269 against tilting movements about the transverse Q-axis.

Figure 13B:
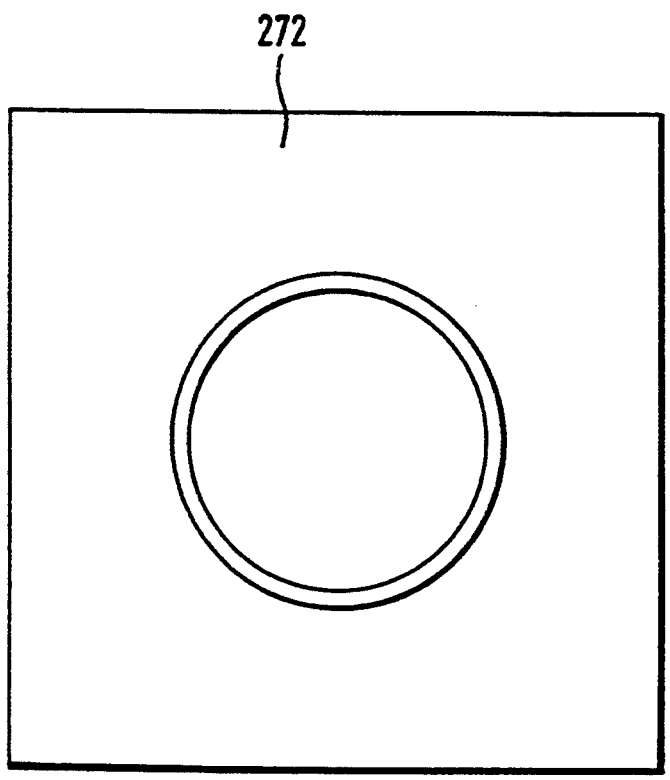
FIG. 13b is a top plan view of the carrier of 13a according to the present invention.

As can be seen from the top view of the disc 272 in FIG. 13b, the area of engagement with the pilot groove is preferably bounded by straight lines. However, a round version is also possible.

Figure 14A:
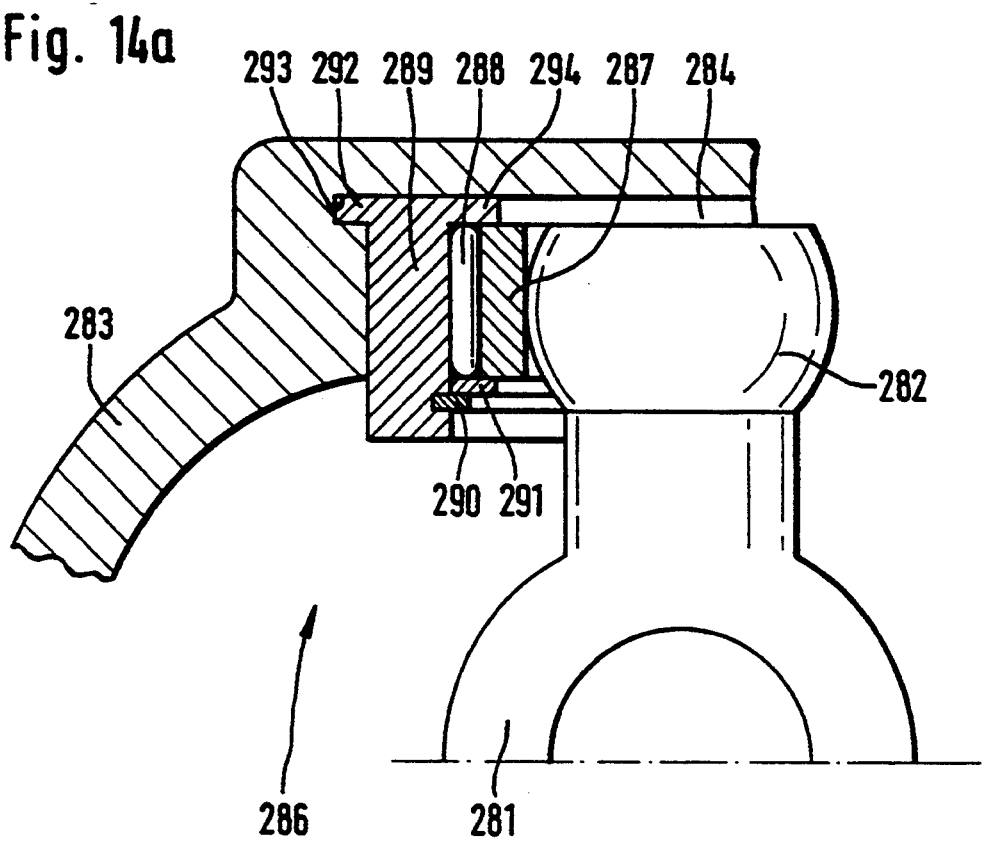
FIG. 14a is a sectional view of a joint according to the present invention.

FIG. 14a shows an annular, inner joint component 281 with one of three circumferentially distributed arms 282 with a partially spherical head. The inner joint component 281 engages an outer joint component 283. The outer joint component is shown with one of three circumferentially distributed recesses 284 that correspond to the three arms. A roller assembly 286 is provided between the spherical head and the recess. The roller assembly includes an internally cylindrical roller carrier 287 and a freely rotatable roller 289 secured to it by a needle bearing 288. The roller 289 has radially outside an internal collar 294 and, with reference to the joint axis, radially inside an assembly consisting of the retainer ring 290 and the disc 291, both designed to retain the roller assembly 286. The roller 289 via an annular shoulder 292, engages a pilot groove 293 from which it has radial and minimal axial clearance with reference to the roller axis. Opposed by forces transmitted radially outward to the roller carrier 287 by the arm, the roller 289 is directly supported at the bottom of the cavity 284 by means of the collar 294, while the radially inward support of the roller assembly by the pilot groove is provided using the annular shoulder 292.

Figure 14B:
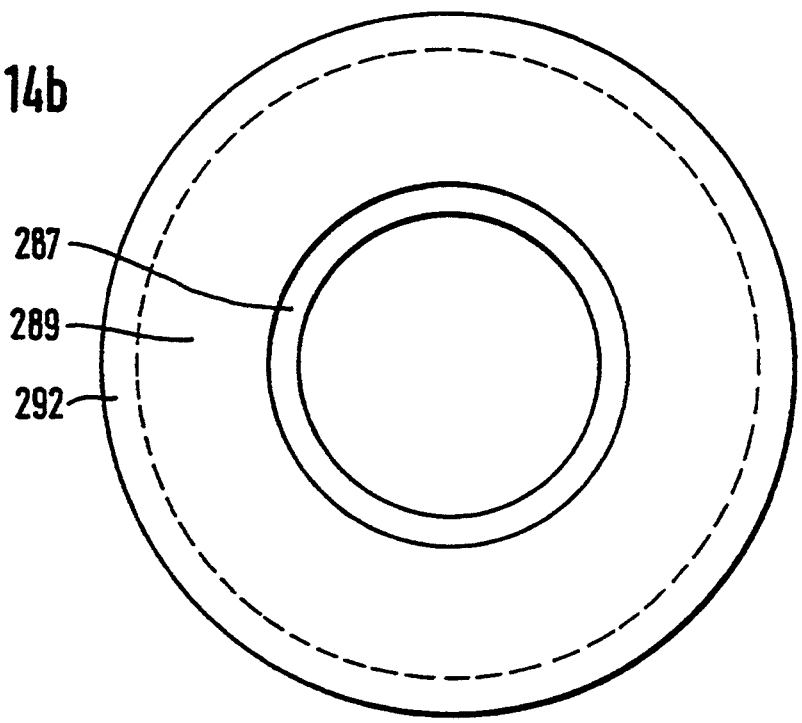
FIG. 14b is a top plan view of the carrier of 14a according to the present invention.

As can be seen from the top view in FIG. 14b, the annular shoulder 292 extends directly from the roller 289 and is, in top view, of a circular shape.

Figure 15A:
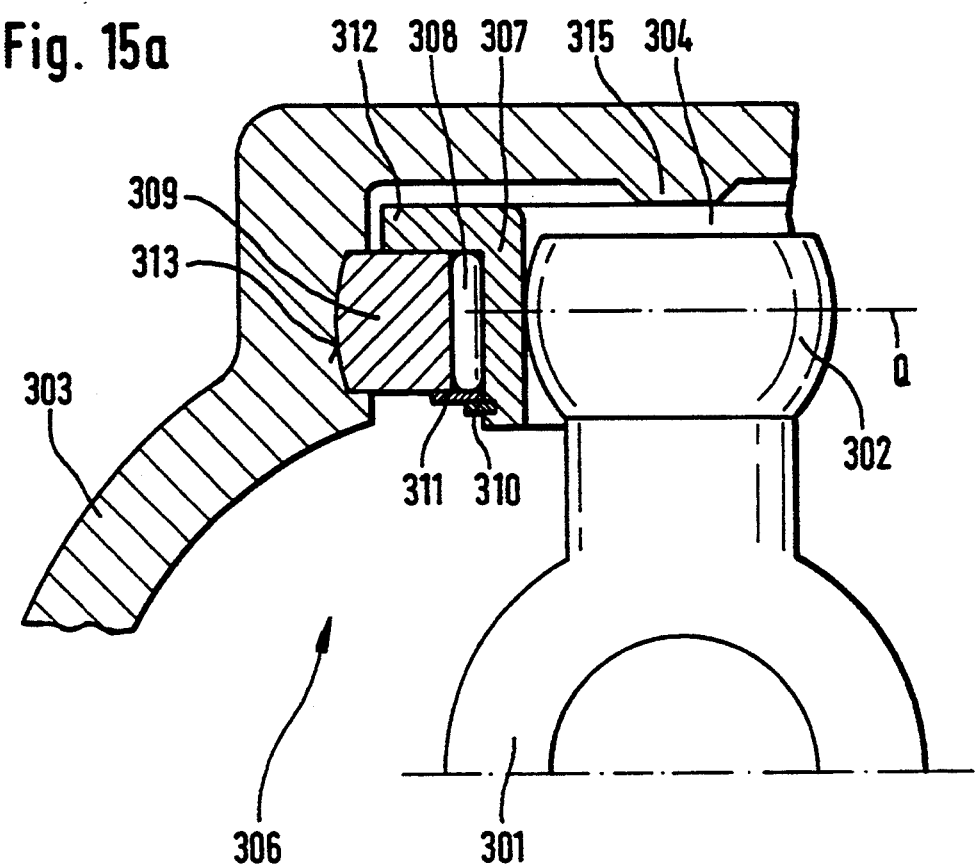
FIG. 15a is a sectional view of a joint according to the present invention.

FIG. 15a shows an essentially annular inner joint component 301 with one of three circumferentially distributed arms 302. The inner joint component 301 is inserted in an outer joint component 303, shown with one of three circumferentially distributed recesses 304 that correspond to the arms. A roller assembly 306 for transmission of induced torque is provided between the arm 302 and the outer joint component 303. The arm 302 has a partially spherical head which engages an internally cylindrical opening of a roller carrier 307 that supports a freely rotating roller 309 via a needle bearing 308. The roller and needle bearing are axially secured to the roller carrier 307 via a retaining ring 310 and a disc 311 in conjunction with an external annular shoulder 312. The roller 309 directly engages in a pilot groove 313 of the outer joint component, using its flanks to support against radial forces introduced to the roller assembly by arm friction, backed by the outer joint component 303. The roller carrier 307 is directly supported by a guide rail 315 of the outer joint component relative to tilting movements about the Q-axis.

Figure 15B:
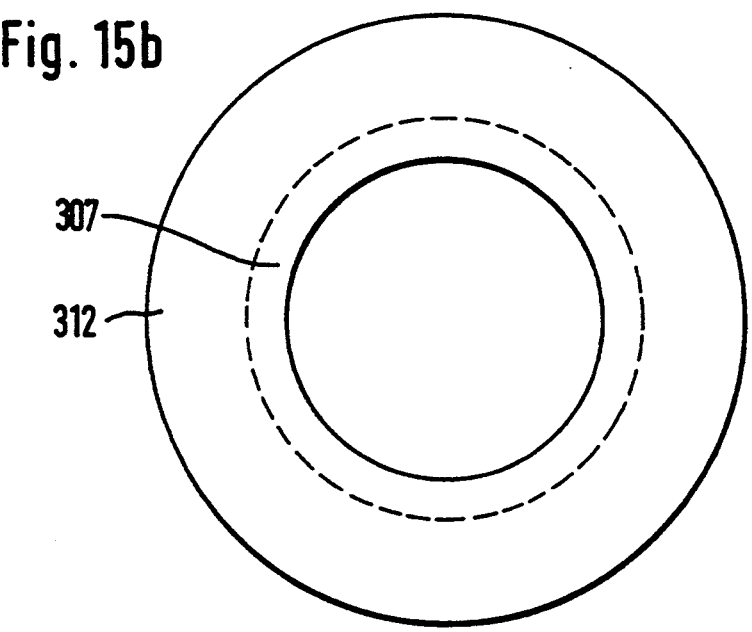
FIG. 15b is a top plan view of the carrier of 15a according to the present invention.

As can be seen from the top view of the roller carrier 307 in FIG. 15b, the roller carrier, including the annular shoulder 312, is preferably of a circular shape. Another version bounded by straight lines or sides is also possible.

Figure 16A:
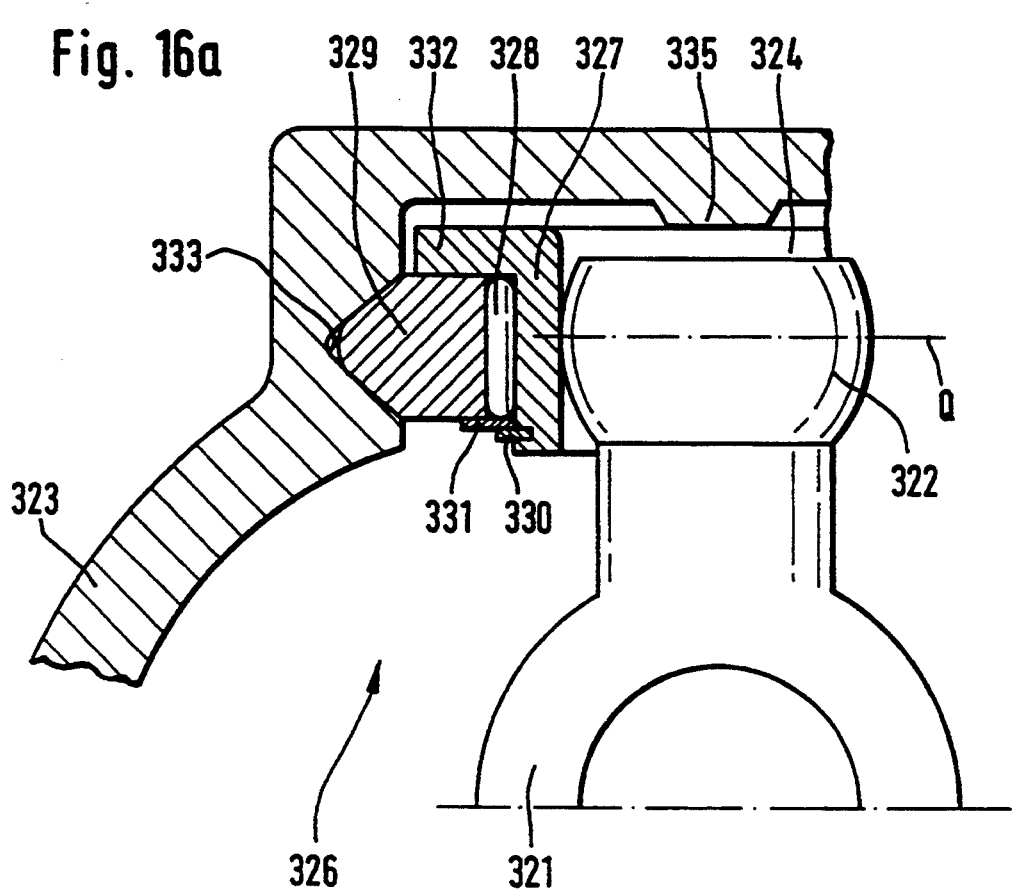
FIG. 16a is a sectional view of a joint according to the present invention.

FIG. 16a is an essentially annular inner joint component 321 shown with one of three circumferentially distributed arms 322. The inner joint component 321 is inserted in an outer joint component 323, shown with one of three circumferentially distributed recesses 324 that correspond to the arms. A roller assembly 326 for transmission of induced torque is provided between arm 322 and outer joint component 323. The arm 322 has a partially spherical head which engages an internally cylindrical opening of a roller carrier 327 that supports the rotating roller 329 via a needle bearing 328. The roller and needle bearing are axially secured to the roller carrier 327 via a retainer ring 330 and a disc 331, in conjunction with an external annular shoulder 332. The roller 329 directly engages a pilot groove 333 of the outer joint component, the flanks of which serve as its support against radial forces introduced to the roller assembly by arm friction. The roller carrier 327 is directly supported by a guide rail 335 of the outer joint component opposite tilting moments about the Q-axis.

Figure 16B:
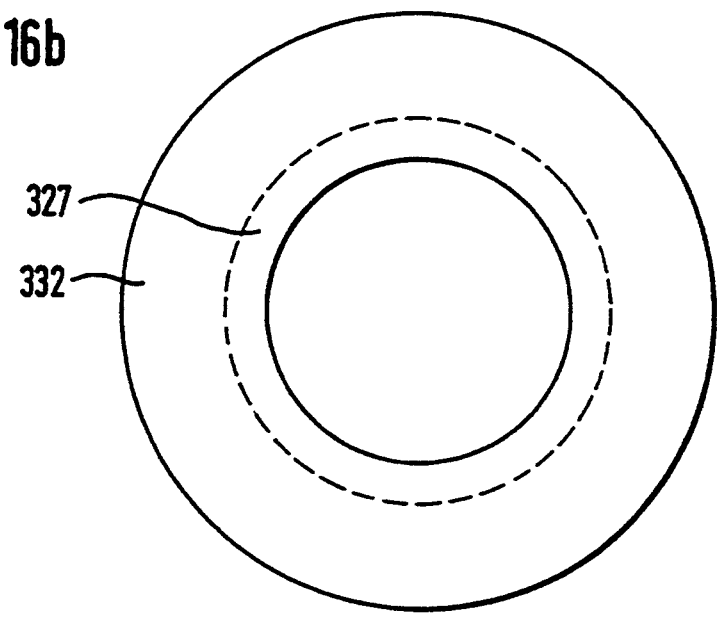
FIG. 16b is a top plan view of the carrier of 16a according to the present invention.

As can be seen from the top view of the roller carrier 327 in FIG. 16b, the roller carrier, including its annular shoulder 332, preferably is of a circular shape. Also, however, another design version bounded by straight lines or sides is possible.

Figure 17A:
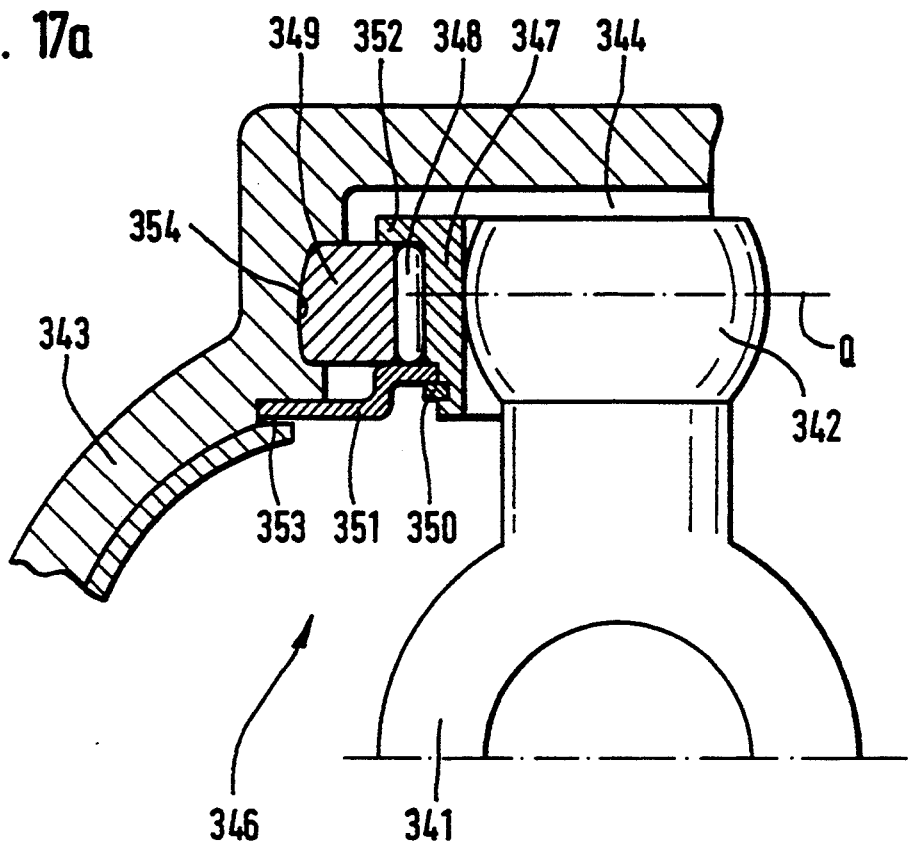
FIG. 17a is a sectional view of a joint according to the present invention.

FIG. 17a shows an essentially annular, inner joint component 341 with one of three circumferentially distributed arms 342. The internal joint component 341 is inserted in an outer joint component 343, shown with one of three circumferentially distributed recesses 344 that correspond to the arms. A roller assembly 346 for transmission of induced torque is between the arm 342 and the outer joint component 343. The arm 342 has a partially spherical head which engages an internally cylindrical opening of a roller carrier 347 that provides rotational support to a roller 349 via a needle bearing 348. Roller and needle bearing are axially secured to the roller carrier 347 via a disc 351 and a retainer ring 350, in conjunction with an external annular shoulder 352. The roller 349 engages a groove 354 of the outer joint component 343 while the disc 351, radially enlarged with respect to the arm axis, engages a pilot groove 353. The roller 349, opposed by radial forces that are introduced to the roller assembly by arm friction, is supported by the flanks of the pilot groove 354. Regarding the tilting moments about the Q-axis, the disc 351 is directly supported by the pilot groove 353 of the outer joint component.

Figure 17B:
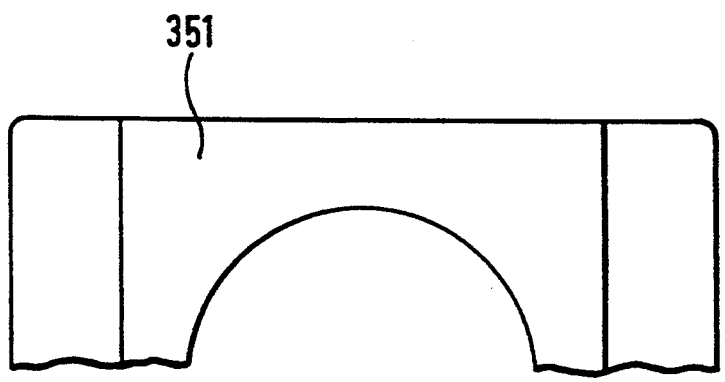
FIG. 17b is a top plan view of the carrier of 17a according to the present invention.
Figure 17C:
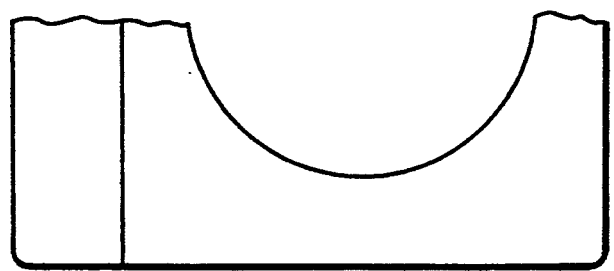
FIG. 17c is a view like 17b of an alternate embodiment according to the present invention.

As can be seen from the top view in FIG. 17b and 17c, the disc 351 may be laterally bound by straight lines according to FIG. 17b, while the disc 351 is symmetrical and allowed to engage the pilot groove on either side. According to FIG. 17c however, the disc is asymmetrical, providing such engagement only on the torque-exposed side of the recess. Alternatively, in top view, this disc may also be of a circular shape.

Figure 18A:
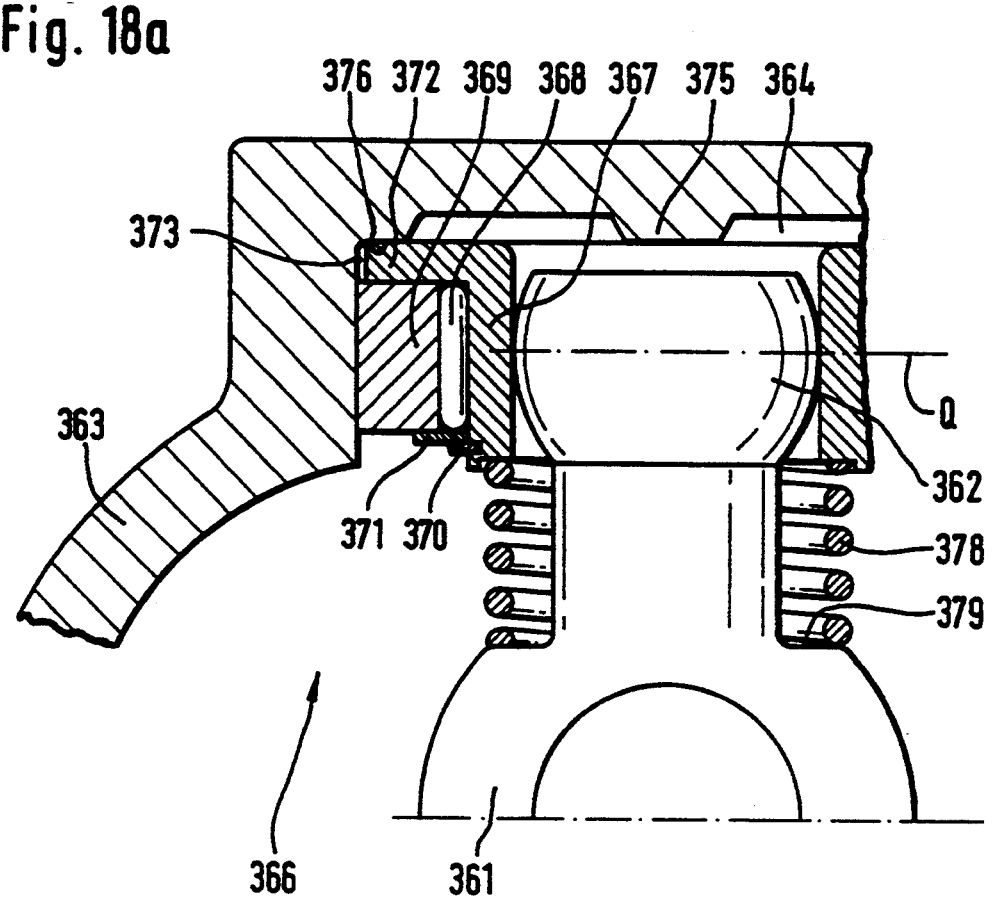
FIG. 18a is a sectional view of a joint according to the present invention.

FIG. 18a shows an inner joint component 361 with one of three circumferentially distributed arms 362. The inner joint component engages an outer joint component 363 of essentially annular shape, in which one of three circumferentially distributed recesses 364 is shown, each of which is engaged by a corresponding arm. A roller assembly 366 is between the spherical head and the tracks formed inside the recesses 364. The roller assembly includes a roller carrier 367 with an internally cylindrical cavity which serves as a guide for the spherical head of the radially sliding and swivelling arm 362. The roller carrier holds a roller 369 via a needle bearing 368, with the bearing and roller secured to a pilot shoulder 372 via a disc 371 and a retaining ring 370. The pilot shoulder, in turn, is supported against radially outward relocation by the shoulder 376 of the recess 364, and against tilting moments about the Q-axis perpendicular to the roller, by a guide rail 375. Radially inward, the roller carrier 367 is directly supported by the support shoulders 379 of the annular, inner joint component 361, via a spring 378.

Figure 18B:
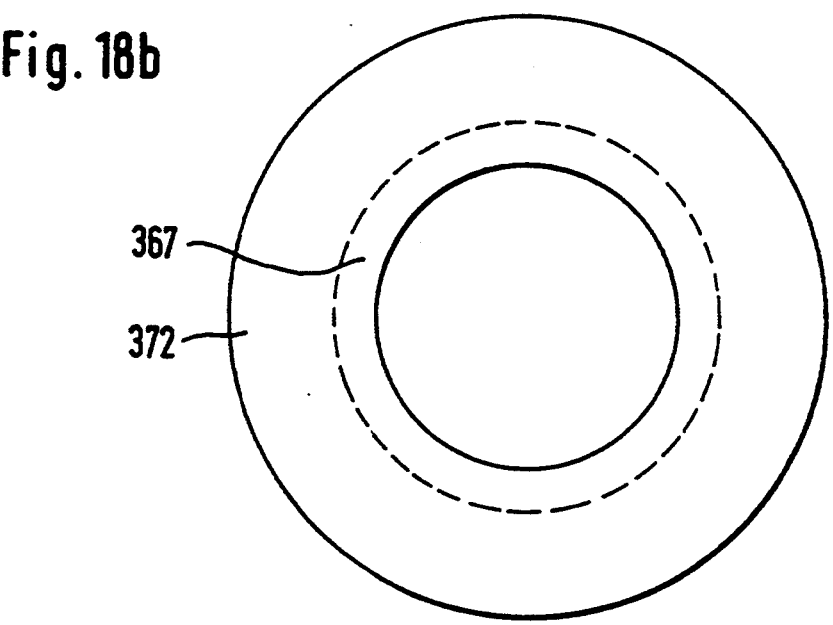
FIG. 18b is a top plan view of the carrier of 18a according to the present invention.

As can be seen from the top view of the roller carrier 367 in FIG. 18b, the roller carrier, including the annular shoulder 372, preferably is of a circular shape. Also, however, another design version bounded by straight edges is, however, also possible.

The means for radial support of the roller assembly in the outer joint component, with reference to the joint axis, as described for all above embodiments, also serve to absorb tilting moments about an axis parallel to the joint axis, which intersects the Q-axis and is perpendicular to the plane of the drawing.

FIG. 19, in an axial view of a recess of the outer joint component, shows rollers, where, in each case, the track of the recess loaded during initiation of torque is intended to be the one shown on the left.

Figure 19A:
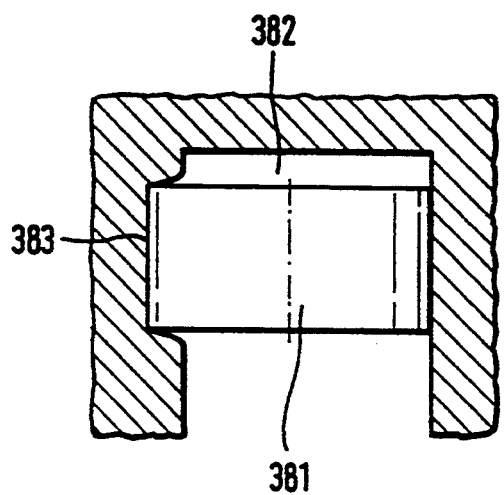
FIGS. 19a through d illustrate various roller and track configurations.

Accordingly, FIG. 19a shows a roller 381 in a recess 382, which is radially guided in a pilot groove 383 only on the side loaded under torque, while guidance is not provided on the opposite side.

Figure 19B:
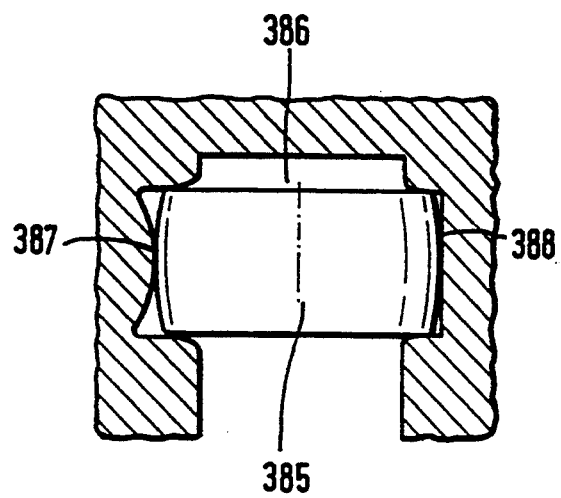

FIG. 19b shows a spherical roller 385 which is guided on both sides of the recess 386 in guides 387, 388 which are essentially rectangular in cross-section.

Figure 19C:
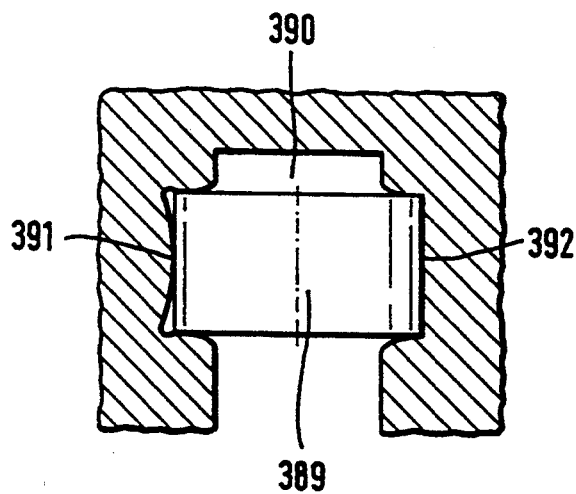

FIG. 19c shows an essentially cylindrical roller 389 which engages a recess 390. On the side of the recess loaded under torque, the supporting guide 391 is convex in cross-section. On the opposite side of the recess the corresponding pilot groove 392 is represented by a rectangular pilot groove.

Figure 19D:
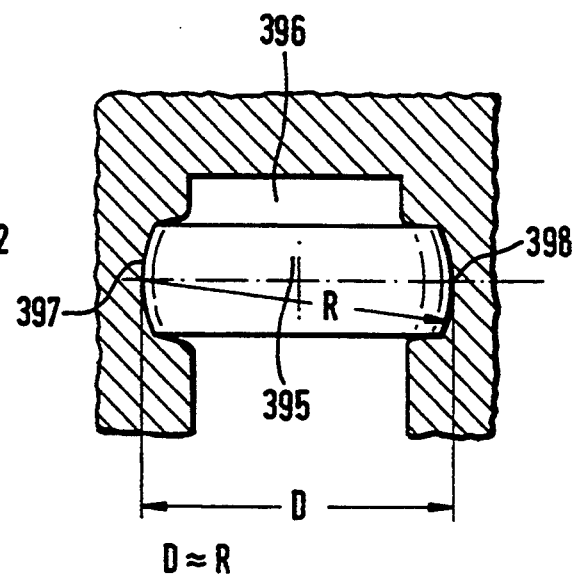

FIG. 19d shows a roller 395 which engages a recess 396. The roller is spherical, and engaged in guide tracks 397, 398 of the recess 396. The guide tracks are correspondingly concave in cross-section. The radius R of the spherical running surface, in cross-section approximately corresponds to the roller diameter D (D=R).

Figure 20:
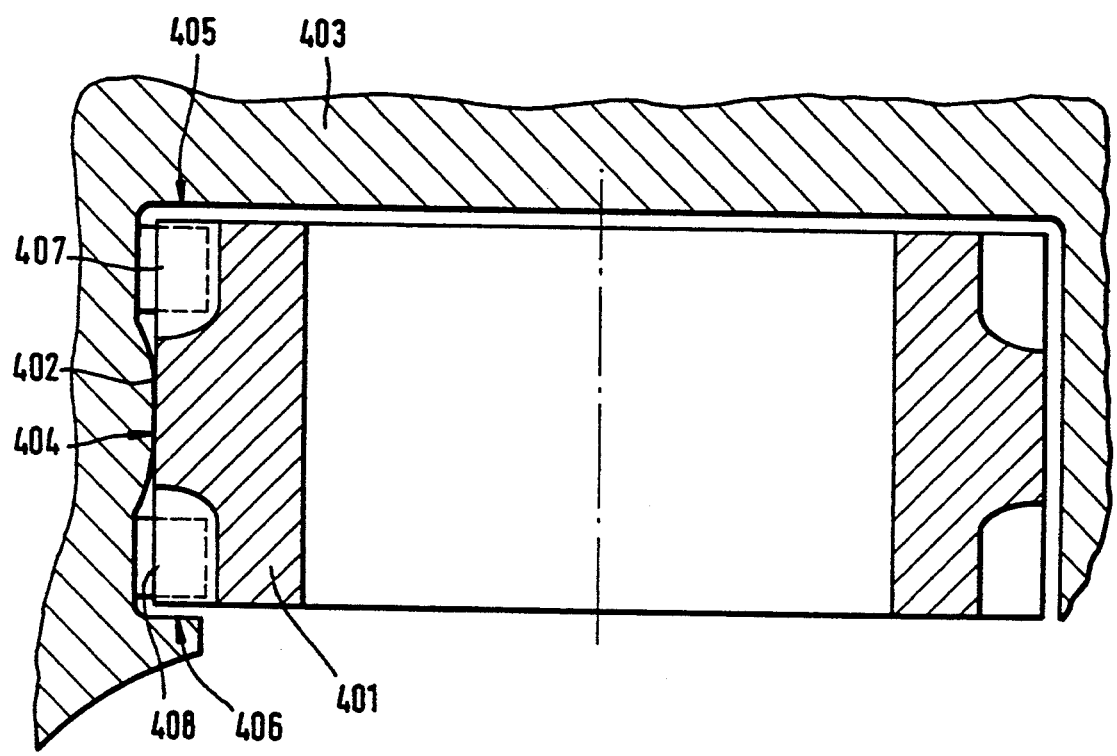
FIG. 20 is a cross-section view of a roller with gears in accordance with the invention.

FIG. 20 shows a roller 401 which engages a pilot groove 402 of an outer joint component 403. The torques are transmitted to the outer joint component in the area of a central running surface 404. Axial support, relative to the roller axis, is provided by the lateral surfaces 405, 406 of the pilot groove 405. Spur gearing 407, 408 is provided in both edge areas of the roller 401. The gearing is designed to engage with corresponding, longitudinal gearing along the groove edges and, thereby, forcing the roller to roll without friction. The location of the gearing may deviate from the one shown, e.g., it may be limited to one edge area, or provided in the center of the roller. The dual gearing shown is also capable of absorbing tilting moments exerted on the roller.

While the above detailed description describes the preferred embodiment of the present invention, the invention is susceptible to modification, variation, and alteration without deviating from the scope and fair meaning of the subjoined claims.

We claim:

1. A tripod joint comprising:
   an outer joint component having three circumferentially spaced recesses with parallel axes which form circumferentially opposing tracks;
   an internal joint component have a spider-shape cross-section with three circumferentially distributed arms which engage in the recesses of the outer joint component;
   roller assemblies are supported on the arms, each roller assembly includes roller-carrying means and a roller directly running in said tracks, at least said roller, relative to its respective arm, is arranged to slide in the axial direction with respect to the arm and swivel with angular movement, relative to the arm axis and said roller having two sides;
   support means for supporting said roller assembly, said support means positioned between the roller assembly and the outer joint component, said support means absorbing tilting moments exerted upon the roller assembly, about an axis parallel with the joint axis, as well as tilting moments about an axis perpendicular to, and spaced from, the joint axis, said support means including the roller having its two sides in contact with a pilot groove of the outer joint component, where a guiding length effective between the pilot groove and the roller, measured in the axial direction of said outer joint component, is at least equivalent to one half of the roller diameter.

2. Tripod joint according to claim 1 wherein one of each of the mutually supporting surfaces of the pilot groove and the roller has in cross-section, at least for one half of the depth of engagement a radius which is greater than or equal to the roller radius.

3. The tripod joint according to claim 1 wherein the outer joint component has a sheet metal sleeve with longitudinal slots allocated to the recesses specifically while forming pilot grooves for roller assemblies.

4. The tripod joint according to claim 1 wherein the pilot groove for a respective roller and an engaging pilot shoulder of the respective roller, are formed on only one side of each recess of the outer joint component.

5. The tripod joint according to claim 1 wherein rollers with cylindrical running surfaces are supported by guiding tracks, only one guiding track each, on one side of each recess is configured with a convex running surface.

6. The tripod joint according to claim 1 wherein rollers with spherical running surfaces are supported in guiding tracks where at least one guiding track, on one side of the recesses, is configured with a convex running surface.

7. The tripod joint according to claim 1 wherein rollers have spherical running surfaces, wherein in cross-section, the spherical radius of the running surface is at least equal to the roller diameter.

8. The tripod joint according to claim 1 wherein rollers include at least one spur gear beside the roller running surface, and axial gear racks engaging the spur gear being positioned on one side of the recesses in the outer joint component.

9. A tripod joint comprising:
   an outer joint component having three circumferentially spaced recesses with parallel axes forming circumferentially opposing tracks;
   an inner joint component having a spider-shaped cross-section with three circumferentially distributed arms engaging recesses of the outer joint component;
   roller assemblies are supported on said arms, each roller assembly includes a roller-carrying means and a roller directly running in said tracks, at least said roller, being arranged to slide in the axial direction with respect to said arm end, relative to its respective arm, swivel with angular movement relative to the arm axis;
   support means between the roller assembly and the outer joint component for absorbing tilting moments exerted upon the roller assembly about an axis parallel with the joint axis, as well as tilting moments exerted upon the roller assembly about an axis perpendicular to, and spaced from, the joint axis;

said support means including at least one pilot flange engaging at least one pilot groove, one of said pilot flange and groove configured from the outer joint component and extends in the axial direction of the outer joint component, and the other being configured at the roller assembly, and said pilot flange is directly guided on both sides by said pilot groove and said support means include at least one roller shoulder radially projecting beyond the running surface of the roller engaging said pilot groove of said outer joint component.

10. The tripod joint according to claim 9 wherein a pilot shoulder is provided on the roller or the roller-carrying means, radially outside of the running surface of the roller relative to the joint axis.

11. The tripod joint according to claim 9 wherein a pilot shoulder is provided on the roller, or a roller-carrying means radially inside of the running surface of the roller relative to the joint axis.

12. The tripod joint according to claim 9 wherein said recesses of the outer joint component are radially open on the outside and externally enclosed by a slide-on sheet metal sleeve installed over the outer joint component.

13. The tripod joint according to claim 9 wherein the outer joint component has a sheet metal sleeve with longitudinal slots allocated to the recesses specifically while forming pilot grooves for the roller shoulders of the roller assemblies.

14. The tripod joint according to claim 9, wherein the respective pilot groove for a roller and an engaging roller shoulder of the respective roller-carrying means or roller, are formed on only one side of each recess of the outer joint component.

15. The tripod joint according to claim 9 wherein an axial, primary means for guidance positioned in each of the recesses of the outer joint component and for external support of the roller assembly against primary tilting moments about a Q-axis, spaced from, and perpendicular to, the joint axis, and a secondary means for guidance provided parallel to the tracks and for supporting the roller assemblies against secondary tilting moments about an axis parallel to the joint axis, and are both applied to the same element of the roller assembly.

16. The tripod joint according to claim 9 wherein an axial, primary means for guidance is provided in combination with the roller-carrying means in each of the recesses of the outer joint component, said guidance means providing coordinated support for the roller assembly against primary tilting moments about a Q-axis, spaced from, and perpendicular to, the joint axis, and secondary means for guidance defined by the shape of the tracks, in direct cooperation with the roller, supports for the roller assembly against secondary tilting moments about an axis parallel to the joint axis.

17. A tripod joint comprising:
an outer joint component having three circumferentially spaced recesses with parallel axes forming circumferentially opposing tracks;
an inner joint component having a spider-shaded cross-section with three circumferentially distributed arms engaging recesses of the outer joint component;
roller assemblies are supported on said arms, each roller assembly includes a roller-carrying means and a roller directly running in said tracks, at least said roller, being arranged to slide in the axial direction with respect to said arm and, relative to its respective arm, swivel with angular movement relative to the arm axis;
support means between the roller assembly and enter joint component for absorbing tilting moments exerted upon the roller assembly about an axis parallel with the joint axis, as well as tilting moments exerted upon the roller assembly about an axis perpendicular to, and spaced from, the joint axis;
said support means including at least one pilot flange engaging at least one pilot groove, one of said pilot flange and groove configured from the outer joint component and extends in the axial direction of the outer joint component, and the other being configured at the roller assembly, and said pilot flange is directly guided on both sides by said pilot groove and said support means includes a pilot shoulder of the roller carrier means radially projecting beyond a running surface of the roller engaging said pilot groove of said outer joint component.

18. The tripod joint according to claim 17 wherein fin a radial top view of the joint, in the area of groove engagement, of a nonrotating roller-carrying means including the pilot shoulder is bounded by straight lines.

19. The tripod joint according to claim 17 wherein in a radial top view of the joint, a nonrotating roller-carrying means including the pilot shoulder is of a circular shape.

20. A tripod joint comprising:
an outer joint component having three circumferentially spaced recesses with parallel axes forming circumferentially opposing tracks;
an inner joint component having a spider-shaped cross-section with three circumferentially distributed arms engaging recesses of the outer joint component;
roller assemblies are supported on said arms, each roller assembly includes a roller-carrying means and a roller directly running in said tracks, at least said roller, being arranged to slide in the axial direction with respect to said arm and, relative to its respective arm, swivel witch angular relative to the arm axis;
support means between the roller assembly and the outer joint component for absorbing tilting moments exerted upon the roller assembly about an axis parallel with the joint axis, as well as tilting moments exerted upon the roller assembly about an axis perpendicular to, and spaced from, the joint axis;
said support means including at least one pilot flange engaging at least one pilot groove, one of said pilot flange and groove configured from the outer joint component and extends in the axial direction of the outer joint component, and the other being configured at the roller assembly, and said pilot flange is directly guided on both sides by said pilot groove and said support means includes a pilot shoulder of a disc being associated to a roller carrier means radially projecting beyond a running surface of the roller engaging said pilot groove of said outer joint component.

21. A tripod joint comprising:

an outer joint component with three circumferentially distributed recesses on parallel axes, which form circumferentially opposing tracks;

an inner joint component having a spider-shape cross-section with three circumferentially distributed arms which engage the recesses of the outer joint component;

roller assemblies being supported on said arms, each roller assembly including roller-carrying means and a roller running directly on said tracks, at least said roller being arranged to slide axially relative to its respective arm and to swivel with angular movement relative to the arm axis:

means for support between the roller assembly and the outer joint component, said support means absorbing tilting moments exerted on the roller assembly about an axis parallel to the joint axis, and absorbing tilting moments exerted on the roller assembly about an axis perpendicular to, and spaced from, the joint axis; and primary means of support for supporting a roller assembly against tilting moments where said primary means, relative to the joint axis, is applied radially to the exterior of the roller assembly and integrally attached to the outer joint component; and secondary means of support applied radially to the interior of the roller assembly relative to the joint axis and said secondary means providing an elastic means supported by the inner joint component.

* * * * *

UNITED STATES PATENT AND TRADEMARK OFFICE
CERTIFICATE OF CORRECTION

PATENT NO. : 5,376,049
DATED : December 27, 1994
INVENTOR(S) : Hans-Heinrich Welschof, Peter Schwärzler, Michael Ricks, Norbert Hofmann, Friedhelm John, Hans Wormsbächer, Dieter Burghardt It is certified that error appears in the above-indentified patent and that said Letters Patent is hereby corrected as shown below:

Column 9, line 59, "views," should be --view--

Column 15, line 57, Claim 16, after "ports" delete "for"

Column 15, line 63, Claim 17, "shaded" should be --shaped--

Column 16, line 6, Claim 17, "enter" should be --the outer--

Column 16, line 25, Claim 18, "fin" should be --in--

Column 16, line 47, Claim 20, "witch" should be --with--

Column 16, line 47, Claim 20, after "angular" insert --movement--

Signed and Sealed this

Nineteenth Day of September, 1995

Attest:

BRUCE LEHMAN

Attesting Officer

Commissioner of Patents and Trademarks